(12) United States Patent
Lange

(10) Patent No.: US 12,242,811 B2
(45) Date of Patent: Mar. 4, 2025

(54) CONVERSATION GRAPH NAVIGATION WITH LANGUAGE MODEL

(71) Applicant: Google LLC, Mountain View, CA (US)

(72) Inventor: Joseph Lange, Zurich (CH)

(73) Assignee: Google LLC, Mountain View, CA (US)

( * ) Notice: Subject to any disclaimer, the term of this patent is extended or adjusted under 35 U.S.C. 154(b) by 320 days.

(21) Appl. No.: 17/671,034

(22) Filed: Feb. 14, 2022

(65) Prior Publication Data

US 2023/0259714 A1 Aug. 17, 2023

(51) Int. Cl.
*G06F 40/35* (2020.01)
*G06F 40/237* (2020.01)

(52) U.S. Cl.
CPC ............ *G06F 40/35* (2020.01); *G06F 40/237* (2020.01)

(58) Field of Classification Search
CPC ......... G06F 40/35; G06F 40/237; G06F 40/30
See application file for complete search history.

(56) References Cited

U.S. PATENT DOCUMENTS

| 5,555,169 | A | 9/1996 | Namba et al. | |
|---|---|---|---|---|
| 9,996,531 | B1 * | 6/2018 | Parastatidis | G10L 15/22 |
| 2005/0097455 | A1 * | 5/2005 | Zhou | G06F 40/205 715/234 |
| 2017/0270929 | A1 * | 9/2017 | Aleksic | G06F 40/295 |
| 2018/0307745 | A1 * | 10/2018 | Bachrach | G06N 3/006 |
| 2019/0251169 | A1 * | 8/2019 | Loghmani | G06F 40/295 |
| 2019/0251966 | A1 * | 8/2019 | Dharne | G06F 3/011 |
| 2019/0341039 | A1 * | 11/2019 | Bharadwaj | G06F 40/30 |
| 2019/0377790 | A1 | 12/2019 | Redmond et al. | |
| 2020/0334740 | A1 * | 10/2020 | Bedell | G06Q 30/0641 |
| 2021/0043194 | A1 * | 2/2021 | Krishnamurthy | G10L 15/22 |
| 2021/0097140 | A1 * | 4/2021 | Chatterjee | G06N 5/022 |

(Continued)

FOREIGN PATENT DOCUMENTS

| WO | 2002103555 | A2 | 12/2002 | |
|---|---|---|---|---|
| WO | 2019203859 | A1 | 10/2019 | |
| WO | WO-2021229321 | A1 * | 11/2021 | G06F 18/214 |

OTHER PUBLICATIONS

International Search Report and Written Opinion for International Application No. PCT/US2023/012699 dated May 17, 2023. 12 pages.

(Continued)

*Primary Examiner* — Bhavesh M Mehta
*Assistant Examiner* — Philip H Lam
(74) *Attorney, Agent, or Firm* — Lerner David LLP

(57) ABSTRACT

Aspects of the disclosure provide for a system for navigating a conversation graph using a language model trained to generate Application Programming Interface (API) calls in response to natural language input from a user computing device. A conversational agent implementing a state handler and a language model (LM) communicates with a user computing device through a user frontend. Rather than communicating directly with a user with output in natural language, the agent uses a (LM) trained as described herein to navigate a conversation graph. The state handler receives API calls generated by the LM and updates the state of a conversation with a user as indicated in the graph. After the update, the state handler can perform one or more predetermined actions associated with a node indicating the current state of the conversation.

16 Claims, 13 Drawing Sheets

(56) References Cited

U.S. PATENT DOCUMENTS

| | | | |
|---|---|---|---|
| 2021/0157990 A1 | 5/2021 | Lima et al. | |
| 2021/0160373 A1* | 5/2021 | McGann | G06F 40/30 |
| 2021/0182935 A1* | 6/2021 | Malkiel | G06F 16/3347 |
| 2022/0100961 A1* | 3/2022 | Vishnoi | G06F 16/35 |
| 2022/0223146 A1* | 7/2022 | Aili | G06F 40/30 |
| 2023/0021797 A1* | 1/2023 | Gupta | G06F 16/3344 |
| 2023/0244968 A1* | 8/2023 | Gurin | G06N 3/0475 |
| | | | 706/11 |
| 2023/0274095 A1* | 8/2023 | Kelkar | G06F 40/49 |
| | | | 704/9 |

OTHER PUBLICATIONS

Byrne et al., "TicketTalk: Toward human-level performance with end-to-end, transaction-based dialog systems", Proceedings of the 59th Annual Meeting of the Association for Computational Linguistics and the 11th International Joint Conference on Natural Language Processing, Aug. 1-6, 2021, pp. 671-680.

Dialogflow CX basics, [online] [retrieved Jan. 4, 2022]Retrieved from the Internet:<URL:http://cloud.google.com/dialogflow/cx/docs/basics>, 10 pages.

Intro to Large Language Models with Cohere, [Online] [retrieved Jan. 4, 2022]. Retrieved from the Internet: <URL:http://docs.cohere.ai/intro-to-llms/>, 6 pages.

\* cited by examiner

CONVERSATION GRAPH NAVIGATION WITH LANGUAGE MODEL

BACKGROUND

Contact Center Artificial Intelligence (CCAI) includes technologies for creating conversational agents, such as chatbots, for understanding and communicating with a user through text or speech. The agents may be deployed to automatically assist users in performing a number of tasks, such as making an online purchase, booking a hotel room or car rental, or assisting the user with technical support. Agents may use or follow conversation graphs tracking states of a conversation with users from a number of possible states in the conversation.

Language models (LMs) include machine learning models, such as deep neural networks, recurrent neural networks, transformers, etc., trained to learn a probability distribution over sequences of words or tokens. LMs and other machine learning or statistical models are trained to produce text that is similar in structure to text presented in the training data. LMs can be used, for example, for simulating human-like responses to questions or requests for information. Large language models (LLMs) can be trained on large quantities of text data, for example including billions of words or tokens.

A conversational agent may use an LM for identifying requests of a user through provided input, for example through natural language processing of received speech or text. In some cases, agents relying on LMs may become incoherent in conversing with users. Further, the complexity of a conversation can lead to issues, for example, if a user switches subjects too often during a session. Complex conversations become unmanageable quickly, even when the agent uses a conversation graph to track the current and previous states of a conversation.

Another problem may arise if the agent receives information out of an expected or order or if the agent receives too much information at once, particularly if the agent is configured to follow a script in which pieces of information are prompted to the user and responses are received one-by-one. A conversational agent may have issues in "remembering" previous information provided to the agent. For example, if the agent receives a prompt from a user that says, "I want to visit the shop to get some clothing with background color black," the agent should not later prompt the user for the background color again during the session.

Yet another issue that may arise is when the user makes multiple requests, requiring multiple passes through the conversation graph. For example, if the user wishes to purchase both a T-shirt and a hat, the agent may not be equipped to handle both requests, together.

BRIEF SUMMARY

Aspects of the disclosure provide for a system for navigating a conversation graph using a language model trained to generate Application Programming Interface (API) calls in response to natural language input from a user computing device. An agent implements a state handler and an LM and communicates with a user computing device through a user frontend. The frontend and agent together are part of a system referred to in this specification as a Graph AI Navigator (GAIN) system. Rather than communicating directly with a user with output in natural language, the agent can use a machine learning or statistical model, such as a language model, trained as described herein to navigate a conversation graph. The state handler receives API calls generated by the LM and updates the state of a conversation with a user as indicated in the graph. The state handler can perform one or more predetermined actions associated with a node indicating the current state of the conversation, after the update. For example, the agent can prompt the user for more information, provide responses to user queries, or perform other actions to advance or terminate the conversation.

Aspects of the disclosure provide for a system including: one or more processors configured to: receive user input; process the user input through a language model trained to receive the user input and generate one or more function calls, the one or more function calls including a first function call which, when executed by the one or more processors, causes the one or more processors to perform one or more predetermined actions associated with a node of a conversation graph specified in the function call; and in response to the user input, perform the one or more predetermined actions associated with the node in the conversation graph.

Aspects of the disclosure provide for a method including: receiving, by one or more processors, user input; processing, by the one or more processors, the user input through a language model trained to receive the user input and generate one or more function calls, the one or more function calls including a first function call which, when executed by the one or more processors, causes the one or more processors to perform one or more predetermined actions associated with a node of a conversation graph specified in the function call; and in response to the user input, performing, by the one or more processors, the one or more predetermined actions associated with the node in the conversation graph.

Aspects of the disclosure provide for one or more non-transitory computer-readable storage media storing instructions that when executed by one or more processors, causes the one or more processors to perform operations including: receiving user input; processing the user input through a language model trained to receive the user input and generate one or more function calls, the one or more function calls including a first function call which, when executed by the one or more processors, causes the one or more processors to perform one or more predetermined actions associated with a node of a conversation graph specified in the function call; and in response to the user input, performing the one or more predetermined actions associated with the node in the conversation graph.

These and other aspects can include one or more the following features, alone or in combination. In some examples, aspects of the disclosure include all of the features, together.

The conversation graph includes nodes each representing a possible state of a conversation between an automated conversational agent and a user, and edges between the nodes representing transitions between states in the conversation, the edges and nodes each associated with respective one or more predetermined actions, and wherein the one or more processors are further configured to: update the state of the conversation graph to indicate that the current node in the conversation graph is the node specified in the function call; and perform the one or more predetermined actions corresponding to the current node of the conversation graph.

The one or more function calls are Application Programming Interface (API) calls of an API.

The one or more predetermined actions include one or more of: sending a prompt to a user computing device for more information for responding to the user input; providing information responsive to the user input; updating one or more parameter values with information provided from the user input, the one or more parameters saved in one or more memory devices by the one or more processors; and updating the current node in the conversation graph to a different node and performing one or more predetermined actions associated with the different node.

The language model is further trained to receive the user input and additional information including one or more of a current position in the conversation graph, data specifying a path to the current position from a root node of the conversation and the one or more saved parameter values and generate the one or more API calls based on the user input and the additional information.

The one or more processors at least partially implement a user frontend and a state handler, and wherein the one or more processors are further configured to: send, by the state handler, a prompt for the user input; receive, from the user frontend, the user input; send, to the language model, the user input and the additional information; receive, from the language model and by the state handler, the one or more API calls; and in response to receiving the one or more API calls, perform, by the state handler, the one or more predetermined actions.

The one or more processors are further configured to: train the language model until reaching one or more convergence criteria, wherein in training the language model, the one or more processors are configured to perform one or more iterations of: sending, as input to the language model, a training example representing at least a portion of a session log labeled with an API call, the session log generated using the conversation graph, and computing a loss between a generated output of the language model from the training example, with the labeled API call, and updating one or more model parameter values of the language model based on the computed loss.

In computing the loss, the one or more processors are configured to compute a lexicographical distance between the labeled API call and the generated output.

In training the language model, the one or more processors are further configured to: receive a base language model not trained using training examples including session logs generated using the conversation graph; and train the base language model for the one or more iterations using training examples representing at least portions of session logs corresponding to conversations generated based on the conversation graph.

The user input is a first user input; and wherein the one or more processors are further configured to: receive a second user input that is different from the first user input; generate one or more second API calls in response to receiving the second user input; and determine that the one or more second API calls include an API call to update the state of the conversation node to a next node that is not next adjacent to a current node representing the current state of the graph, and in response: save the current node, update the current state of the conversation graph to the next node, perform the one or more predetermined actions associated with the next node, and, update the state of the conversation graph back to the saved node.

DETAILED DESCRIPTION

Overview

Figure 1:
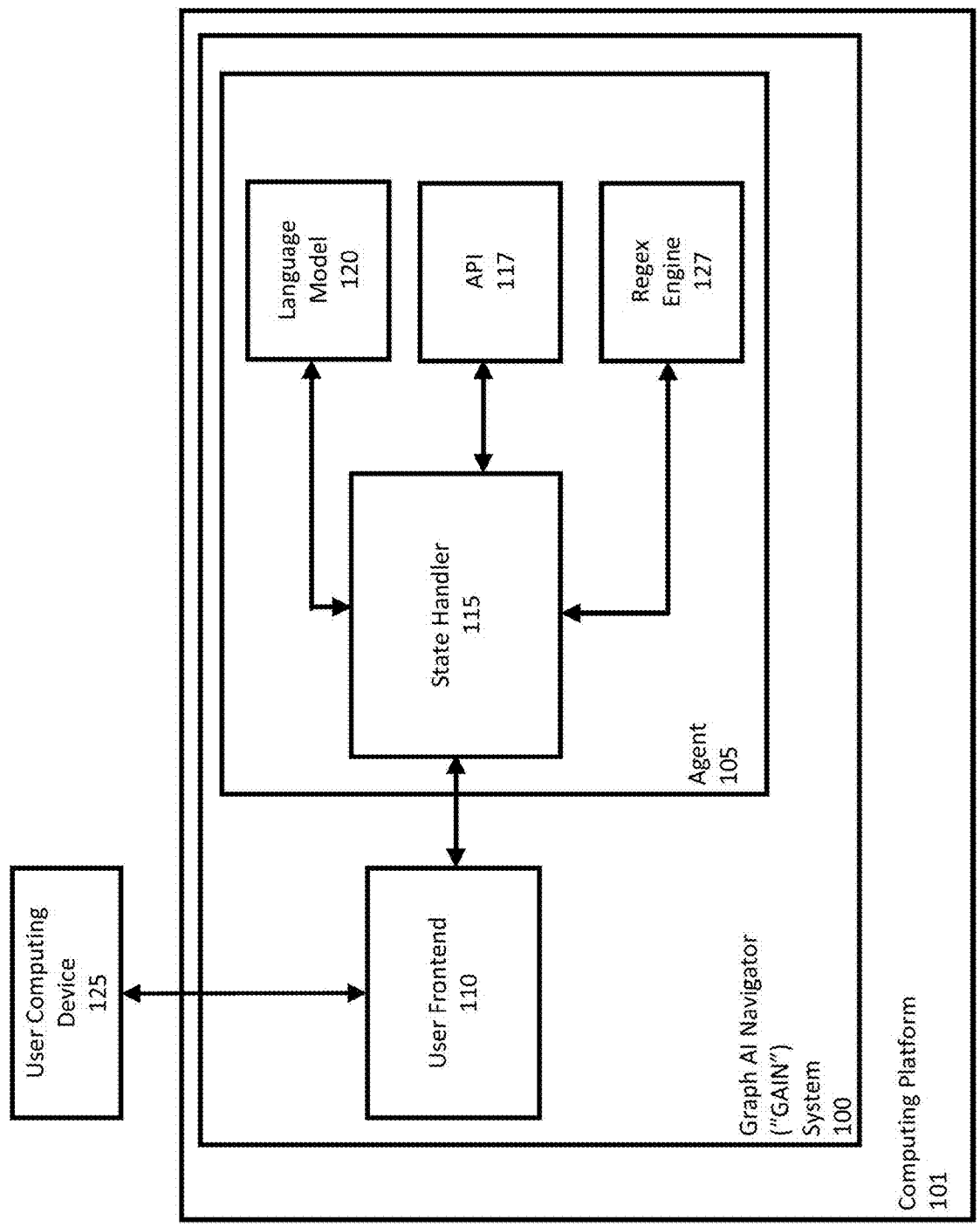
FIG. 1 is a block diagram of a Graph AI Navigator (GAIN) system.

Aspects of the disclosure provide for a Graph AI Navigator ("GAIN") system for navigating a conversation graph using a language model (LM). Rather than generate natural language for communicating with a user directly, the LM is trained to receive user input and information corresponding to the state of a conversation graph and generate one or more API calls which cause the agent to perform predetermined actions based on the received input. The API calls enable the agent to more accurately and efficiently execute tasks to assist users in a variety of different use cases.

Example tasks can be for example, helping users with technical support, supporting customers in making online purchases of goods or services, or being an on-demand source of information, which can be queried using questions in spoken or written natural language. A conversation graph can be built to organize how the agent communicates with the user, defining certain prompts and responses to user input depending on where in the conversation graph the agent is currently in contact with the user.

The conversational agent can be built from a framework implementing the GAIN system, for example a CCAI framework or other framework for building conversational user interfaces, such as virtual agents, including chatbots or voicebots.

For example, if a user wants to build a conversational agent for automating transactions on their web store front for T-Shirts, the user can submit a conversation graph outlining how the agent should respond to and prompt a user interacting with the agent, for example through a text chat or over the phone.

To track progress through the conversation, the agent maintains information related to a traversal of a conversation graph. The conversation graph can represent the states a conversation between a user and an agent can be in. For example, in an initial state of the conversation graph, the agent sends a greeting to the user.

The agent receives user input, for example text indicating that the user would like to make a purchase. To identify the user's request, the agent passes the user input through the LM. The LM, in turn, generates function calls, such as API calls. The API calls cause the agent to navigate the conversation graph, changing its state to a different node of the graph. Each node of the graph can represent a possible state.

For example, upon detecting that the user is requesting to purchase a T-Shirt, the LM can issue an API call that causes the agent to navigate through a sequence of nodes in the conversation graph for receiving information related to purchasing the T-Shirt, such as desired T-Shirt size, color, etc., before confirming the purchase order. The agent can communicate this information through a state handler, acting as an intermediary between a user frontend from which user input is received, and the LM trained to generate API calls and not natural language. The state handler sends natural language output to the user through the user frontend, based on predetermined text associated with nodes in the conversation graph.

At least because the agent uses the state handler as an intermediary between a user frontend and the LM, the state handler can act as a filter to prevent unsafe behavior that may otherwise occur from language models trained to output natural language directly communicating with a user. For example, the language model may perpetuate biases, prejudices, or offensive language unintentionally learned from unfiltered training data. In other examples, the language model may have a certain style or branding that must be enforced, controlling the manner in which the agent communicates. Instead, aspects of the disclosure provide for a system in which the conversation is controlled but proceeds naturally based on agent predicting to which position the session should advance to in the conversation graph.

Aspects of the disclosure also provide for at least the following technical advantages. The LM of an agent as described herein can accurately determine which state of a conversation graph is most appropriate for handling user requests and queries. For LMs trained to respond with natural language in response to user input, LMs require predicting the intent of the user through input provided as part of the conversation. Previously, intents would have to be separately defined, and a further intent combining separate intents would have to be explicitly defined to handle the case in which the user expresses more than one interest. The agent implementing the LM can use a comparatively simpler graph organizing the logic of desired communications with a user, without adding additional pathways to account for every possible transition between states of the conversation. These additional transitions are used to support user input with multiple "intents" or requests that a user might use sequentially or concurrently in a conversation. The conversation graph does not need to be pre-labeled with paths through the graph based on a predicted intent. Rather, the GAIN system can directly go from receiving user input to determining the sequence of the API calls for navigating the graph, reducing the required complexity of the graph.

The LM can be trained on relatively smaller datasets relative to other language models that generate natural language as output. As described herein, session logs of conversations between a user and an agent can be used to generate many different training examples, as opposed to approaches for training LM to output natural language, which require large amounts of natural language training data.

Different LMs can be pre trained for navigating conversation graphs in different fields, such as telecommunications, retail transactions, or technical support. These different LMs can be fine-tuned from a base LM, trained generally as described herein for navigating graph or graph-like structures. An LM can be further fine-tuned with session data labeled with API calls for navigating through a previously unseen conversation graph, allowing users to provide their own unique requirements to build a conversational agent capable of addressing user requests in line with the provided graph. A base LM can be a base model trained on natural language, and further trained to generate API calls as output for navigating a conversation graph. In other examples, the base LM can be trained for navigating certain types of conversation graphs, for example graphs related to conversations between a user and an agent in a domain such as retail shopping, tech support, healthcare, etc., and be further trained with session data for a specific conversation graph within one of those pretrained domains. The use of a base LM as described herein can allow for specialized LMs to be fine-tuned from the base LM across different domains, and with relatively less training data required versus not using a base LM.

The GAIN system can adapt to previously unseen conversation graphs with different use cases and conversation logic. As a result, the GAIN system can be adapted to a number of different use cases without significant resource expenditure, otherwise resulting in wasted energy or processing time for training or fine-tuning a model. In addition, the conversation graph can be provided with fewer predetermined details, as opposed to graphs processed by conventional agents, which require much more structure and expert feedback to create graphs that do not result in unrecoverable error by the agent during a session. Time to label data and design a graph with correct logic is reduced as a result. The GAIN system can train on and process conversation graphs closer in form to the base logic of the conversation desired to be implemented by a conversational agent, for example as a business logic graph.

The GAIN system can easily receive hardcoded rules or heuristics where necessary, for example to require certain actions to always be taken in response to certain input. For example, hardcoded rules can be included when the agent navigates to a state in the conversation requiring confirmation for making a purchase. Additional caution may be made to reduce the chance of misinterpretation, for example by requiring that the confirming user input include a specific sequence of words or phrases. Heuristics or hard coded rules can be incorporated into the GAIN system through extreme weighting, for example taking a maximum weight value and applying that value to a given heuristic or rule.

As described herein, the agent can implement checkpointing or multiple instances of a conversation graph to correctly navigate the conversation graph to provide the requested information to a user, without inefficiently repeating itself or requesting information the user has already provided. Checkpointing allows the agent to break the flow of a conversation to address different requests received by a user, while allowing the agent to later return to the conversation flow at a state in the graph saved by the checkpoint. In this way, the LM can better handle "jumps" from conversation state to conversation state, allowing the agent to be more versatile and less prone to failure, even during complex conversations.

The LM can also handle natural language input in languages different from the language of the training data used to train the LM, not requiring computing resources like processor time to be wasted retraining a model for a desired target language. Training the LM using natural language input in one language, for example in English, can provide a knowledge transfer between other languages the LM may process at inference, for example French. As a result, the LM does not require training data in different languages to provide multi-language support, which further reduces training time and computing resource expenditure in use cases in which an agent may be expected to converse in multiple languages.

Example Systems

FIG. 1 is a block diagram of a Graph AI Navigator (GAIN) system 100. The GAIN system 100 includes a user frontend 110 and an agent 105. The agent 105 includes a state handler 115 implementing an Application Program Interface (API) 117 and a language model 120. The GAIN system can be implemented on one or more processors, for example on one or more computing devices of a computing platform 101, described herein with reference to FIG. 9.

The computing platform 101 can host a variety of different applications or services configured to receive user input, for example, provide responsive information to the query or perform some action, such as performing operations on one or more processors for executing a transaction for purchasing a good or service.

User computing device 125 may be any of a variety of devices configured to communicate with the computing platform 101, for example over a network. Example user computing devices include a personal laptop, a personal mobile device or other handheld device, a wearable device, such as a helmet, glasses, a smartwatch, earbuds, etc., or a game console. Although shown separately, in some examples as and as described herein with reference to FIG. 8, the agent may be implemented on the user computing device.

The LM 120 can be any of a variety of different machine learning or statistical models, such as deep neural networks, recurrent neural networks, transformers, etc. As described herein, the LM is trained to receive user input and the state of a conversation represented in a conversation graph and generate one or more API calls for causing the agent to perform one or more actions in response to the user input. The LM can be a large language model, for example initially trained and then fine-tuned or retrained with session log data, as described herein with reference to FIG. 4. Although examples are provided herein for training a LM, it is understood that any of a variety of different machine learning or statistical models that can be trained as described herein, may be used, not limited to language models or large language models.

Although one example described is an agent receiving a user query and navigating a graph in response, the graph itself may not necessarily be a conversation graph. The graph can be, for example, an analog of a real physical location, and the agent can be trained to receive user input specifying directions and output API calls causing another physical agent, such as a robot, to move around the location in accordance with the output calls.

The state handler 115 can refer to one or more components of the system 100 for communicating with a user frontend and the LM 120. The state handler 115 also stores the state of the conversation between the user and the conversation agent. Note that the state handler is an intermediary, preventing the output of the LM from reaching the user frontend directly, and vice versa. The state handler can be at least partially implemented as one or more processors, configured to execute software for receiving and acting on API calls received from the conversational agent. The state handler can define an API of potential operations that can be performed, invoked through one or more function calls.

The state handler 115 generates text or speech that will be sent to the user through the user frontend. The state handler 115 sends predetermined text or speech depending on the API call received from the LM 120. The current state of the conversation may determine what API calls can be invoked on the state handler 115. The current state of the conversation is based on which node of the conversation graph the state handler 115 is currently on, which is associated with a number of predetermined actions that the state handler 115 can perform. For example, based on the received API call, the state handler 115 can update the current state of the graph to a node indicated in the API call. The state handler 115 generates text or speech associated with the node of the update state, The predetermined actions can include prompting the user for more information, prompting the user for clarification, confirming that some decision or action have been taken, or asking the user if they wish to do something else before the session ends.

Referring to the example herein of an agent for a retail store, example API calls can include a setAction( ) call, for example to navigate to a node associated with predetermined actions causing the agent to prompt the user for what course of action they wish to take (for example, make a purchase, refund an item, etc.). Other example API calls include setColor( ) (for example, to navigate to a node in the conversation graph associated with prompting the user for their preferred shirt color), or ask( ) (for example, to cause the agent to send a question to the user to collect information). More specific calls for asking questions may also be defined, for example askUserColor( ) for asking the user for their preferred color. Another API call may be done( ) (for example, indicating that the session has ended). As described herein, other API calls may be generated by the LM 120 for generating checkpoints between different points of the conversation graph, for addressing multiple requests from the user before any one request is resolved.

When the state handler 115 receives an API call, the state handler 115 saves the current state of the conversation graph, before navigating to a new node. The state handler maintains a history of previous nodes traversed during a session, as well as information received from the user frontend 110 during the session. The LM 120 can receive the current state of the conversation graph and the history as input, in addition to user input from the user frontend 110.

The current state and history can also include any information previously collected from the user frontend, for example in response to earlier prompts sent to the user frontend. In this way, the LM 120 can learn to not navigate to nodes for which information has already been collected. The input can be parsed and structured by the state handler 115 prior to sending the input to the LM 120, for example as shown in the session log of TABLE 1.

The LM 120 can also be trained to implement natural language understanding (NLU), to identify relevant phrases or keywords from user input. Relevancy can be contextual, based on the current state of the conversation. For example, if the agent 105 has prompted the user for the color of a shirt, the LM can receive the user input and determine which keywords or phrases are most likely to be the user's response to the prompt for a shirt color. The LM 120 can extract keywords or phrases, which may be saved by the state handler 115 for future reference. The LM can be trained according to any of a variety of supervised learning techniques, as described herein, for performing NLU.

The agent 105 can also implement a regular expression ("regex") engine 127. The agent can send input text, for example from the user frontend 110, to determine whether the input text matches one or more regular expressions. The regular expressions can be used by the agent 105 to verify input parameters received from the user frontend 110, for example correctly formatted zip codes, telephone numbers, etc. As described herein with reference to FIG. 9, the agent 105 can follow a conversation graph that includes regex nodes, corresponding to regex operations such as pattern matching input text from the user frontend 110 using the regex engine 127.

In some examples, the agent 105 can follow a conversation graph that includes one or more remote procedure call ("RPC") nodes. The RPC nodes, as shown and described with reference to FIG. 9, can cause the agent 105 to perform one or more remote procedure calls for receiving updated data, for example for outputting to the user frontend 110.

Figure 2A:
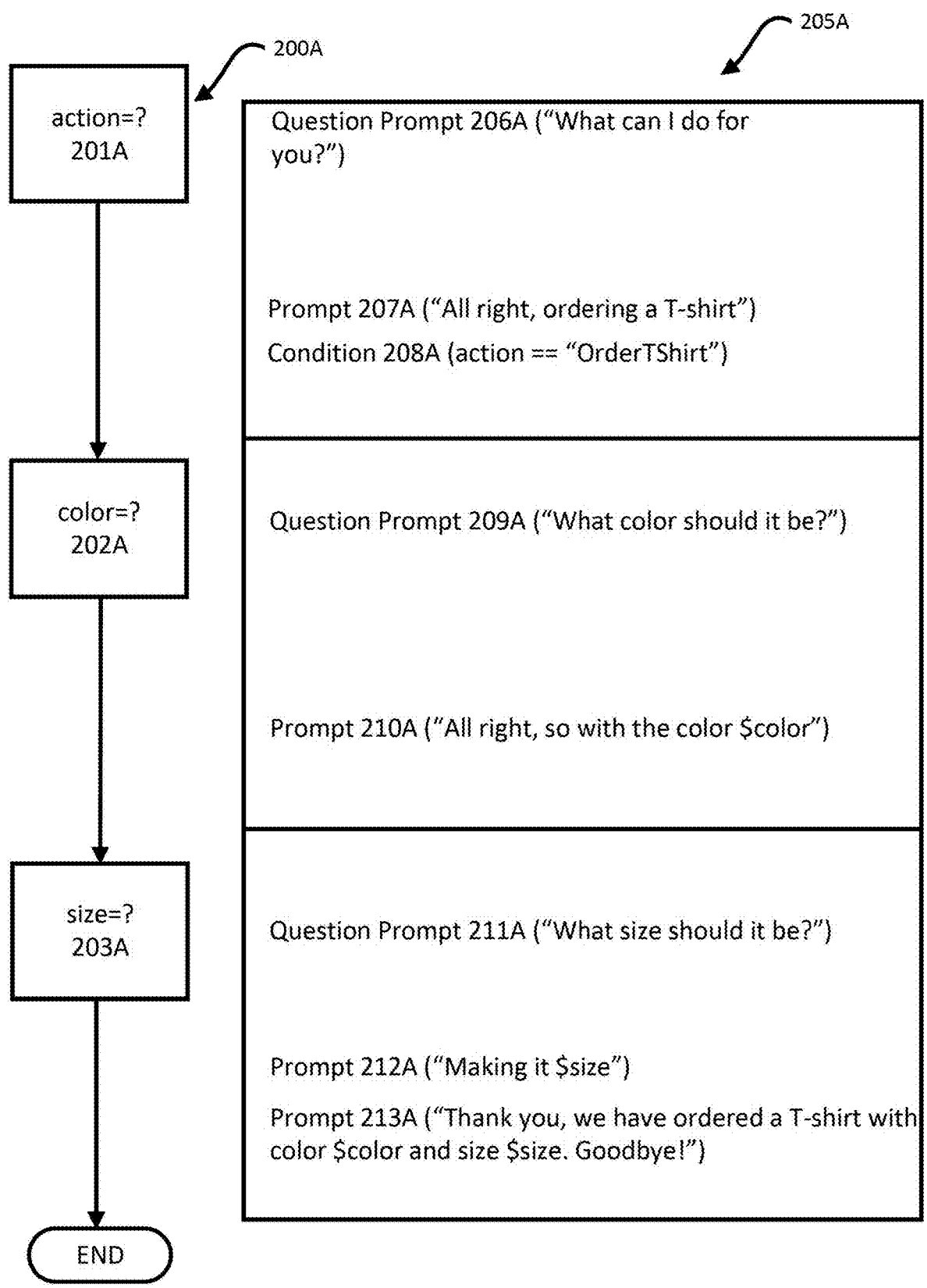
FIG. 2A is a portion of a conversation graph which can be used by a trained LM of a conversational agent.

FIG. 2A is a portion of a conversation graph 200A which can be used by a trained LM of a conversational agent. The conversation graph 200A includes nodes 201A-203A. Predetermined actions 205A are also shown, including prompts and conditions 206A-213A.

The conversation graph 200A includes a number of nodes and edges. Nodes can represent a possible state of a conversation with a user in which the state handler will provide or request information. Although described as a graph, it is understood that the logic of a conversation graph can be implemented in any of a variety of different ways, for example as a list, stack, acyclic or cyclic graph, a tree, array, or a list of code instructions.

At least some of the nodes can correspond to an entity type relating to a word or phrase that may be encountered in user speech or text. Entities can be predetermined, for example as a set of different categories from which the agent is expected to encounter while performing the configured task. For instance, in the case of an agent acting as an online vendor for a T-Shirt store, some entity types may include "shirt size," "artist" (such as an artist appearing on a T-Shirt available for purchase), and "shirt-type" (for example, long-sleeved or short-sleeved).

Each node can be associated with one or more predetermined actions that are performed by the agent. When an agent performs a predetermined action, it is meant that the agent receives one or more instructions, for example as part of the API, which cause one or more processors implementing the agent to perform operations corresponding to the predetermined actions. For example, if an action includes prompting a user for information as part of making an online purchase, the one or more processors may execute operations for outputting, over a network, a prompt on the display of a user computing device, receiving user input in response to the prompt, and saving the user input to one or more memory devices for later retrieval.

In some examples, the predetermined actions may always be performed by the agent when the current state is updated to a respective node or may only be performed upon meeting certain conditions. For example, node 201A is associated with a state handler prompt for a user request, represented by question prompt 206A ("What can I do for you?"). Each node may also have general actions that may be performed at each node but vary contextually with the node representing the current state. For example, if the agent transitions to color node 202A but has not received information about a desired T-Shirt color for the user, the agent can automatically send a question prompt 209A ("What color should it be?"). If a color has already been provided, the agent skips the question prompt 209A.

Predetermined actions may be performed when the agent is transitioning between nodes. For example, the agent can issue the prompt 207A ("All right, ordering a T-Shirt") when condition 208A is met ("action=OrderTShirt"), where OrderTShirt can represent an API call generated by the LM and sent to the state handler.

Figure 2B:
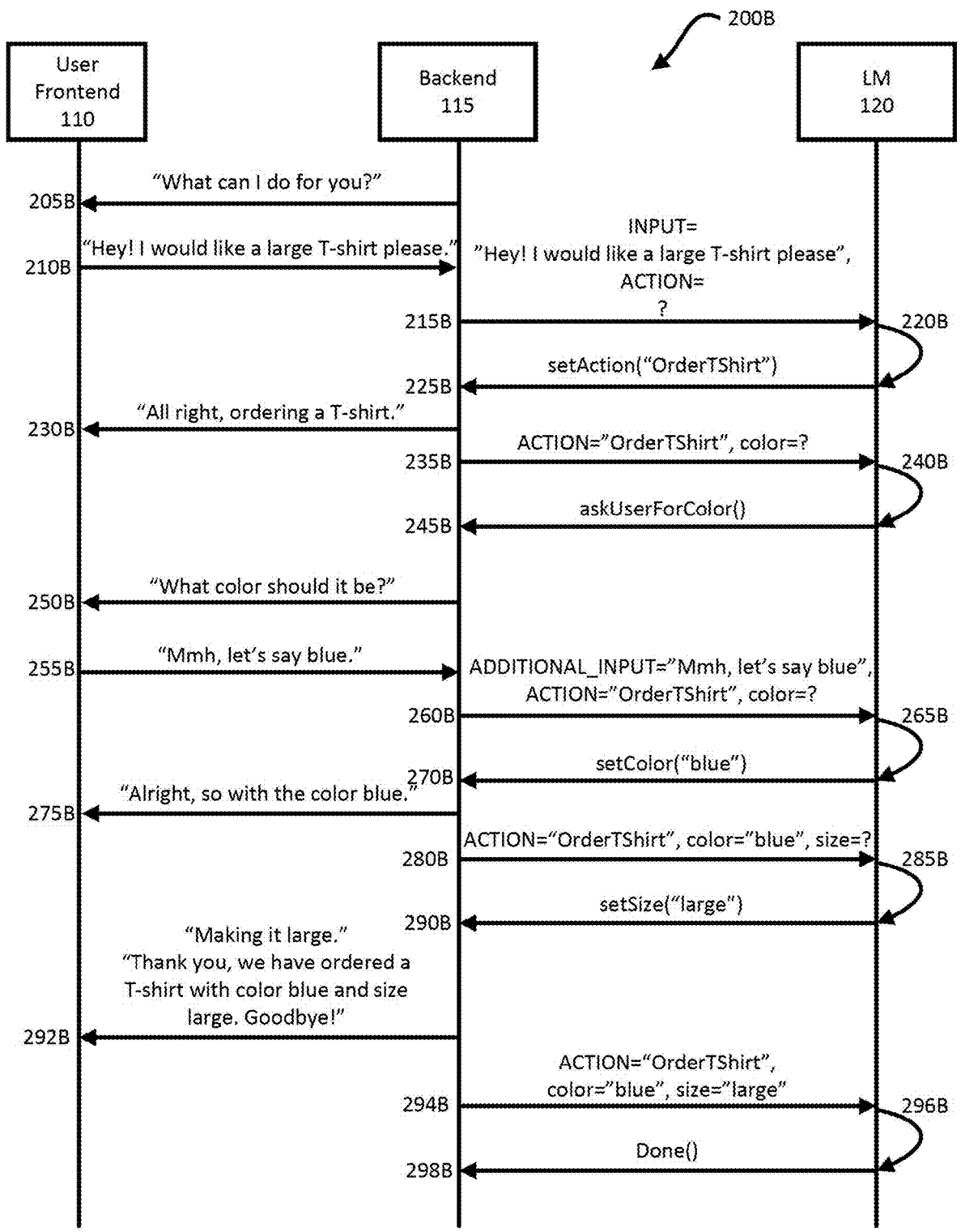
FIG. 2B is a swim lane diagram of an example process for responding to a user query during a session, according to aspects of the disclosure.

FIG. 2B is a swim lane diagram of an example process 200B for responding to a user query during a session, according to aspects of the disclosure. The process 200B shows the separation between communication between the state handler 115 and the LM 120, and the user frontend 110 and the state handler 115.

The user frontend 110 receives an initial prompt from a state handler, according to line 205B. In this example, the state handler sends the text "What can I do for you?" as a prompt for user input.

The state handler 115 receives a response to the initial prompt, according to line 210B. In this example, the state handler 115 receives user input as the text "Hey! I would like a large T-shirt please."

The state handler 115 sends the user input to the LM 120, according to line 215B. The state handler 115 can send the user input in the form of a structured query, for example with a first field for input, and a second field querying the conversation agent for some action to perform. In this example, the state handler sends the structured query "INPUT='Hey! I would like a large T-shirt please', ACTION=?".

The LM 120 processes the structured query, using a language model trained as described herein, according to line 220B. The LM 120 is trained to receive a structured query or other input and generate one or more API calls for the state handler to execute. The output API call is a prediction by the trained language model for what course of action is likely desired by the user, based on the user input. In this example, the user input is predicted to mean that the user of the frontend is interested in purchasing a T-shirt.

The LM 120 sends an API call to the state handler 115, according to line 225B. In this example, the API call is a function named "setAction" with a parameter "OrderT-Shirt". The conversation agent is trained to generate API calls that the state handler is configured to receive and perform one or more operations in response. In this example, the state handler is configured to perform an action specified by the parameter of the "setAction" function.

The state handler 115 sends a response to the user frontend 110, according to line 230B. In this example, the state handler 115 sends the message "All right, ordering a T-shirt." The state handler 115 sends input to the LM 120, as shown in line 235B. The input includes the current state of the conversation graph (ACTION=OrderTShirt) and indicates what parameter values are missing or provided (color=? indicates the value for the color parameter in ordering a T-Shirt is missing).

As shown in line 240B, the LM 120 processes the input provided according to line 235B. In line 245B, the LM 120 outputs an API call to the state handler 115, to advance the conversation graph to a state associated with prompting the user for the color of the shirt. For example, the askUser-ForColor( ) API call can cause the state handler 115 to advance to the color node 203A as shown in FIG. 2A.

The state handler 115 advances to the color node 203A and sends a question prompt to the user frontend 110 as one of the available predetermined actions associated with the color node 203A. The state handler 115 sends the message "What color should it be?", as shown in line 250B. In line 255B, the state handler 115 receives a message ("Mmh, let's say blue.") from the user frontend 110. In line 260B, the state handler 115 sends the input received from the user frontend 115, as well as information from the previous input provided as shown in line 240B. With the additional input ("Mmh, let's say blue."), the LM 120 does not generate an API call prompting the state handler to ask the user for the color, as in line 245B. Instead, the LM processes the input, according to line 265B, and predicts the response from the user input as to the color to be blue. This can be done, for example because the LM 120 is trained for NLU to extract parameter values from natural language input.

In response, the LM 120 sends an API call to the state handler 115 to set the parameter value for color to blue (setColor("blue")), according to block 270B. Because all of the conditions of the color node 202A are met, the API call received at block 270B also causes the state handler 115 to advance to the size node 203A. If the LM 120 was unable to extract a parameter value matching the prompt, the LM 120 would send another API call, for example to cause the state handler 115 to repeat the prompt for a color. In some examples, and as described herein, the LM 120 may receive the input of line 260B and predict that the user is sending a new and separate request. At that point, the LM 120 can generate a checkpoint call to save the current state of the conversation before moving to a different state to address the new request.

The state handler 115 sets a confirmatory message ("Alright, so with the color blue") to the user frontend 110, according to line 275B. According to line 280B, the state handler 115 sends additional input to the LM 120, indicating the current action ("OrderTShirt") provided parameter values ("color='blue'") and unprovided parameter values ("size=?"). At least because the LM 120 can receive input on an ongoing basis, the LM 120 can predict from earlier user input that the size parameter value has already been provided. In particular, the input as in line 215B ("Hey! I would like a large T-Shirt please") can be processed by the LM 120 at line 285B to determined that the parameter value for the size parameter should be large.

In response to the processing at line 285, the LM 120 sends the API call "setSize(large)" to fill in the size parameter value and cause the state handler 115 to advance in the conversation graph, according to line 290B.

The state handler 115 sends the messages associated with the transition away from the size node 203A ("Making it large." "Thank you, we have ordered a T-shirt with color blue and size large. Goodbye!"), according to line 292B. The state handler 115 provides additional input, according to line 294B. The LM 120 processes the provided input, according to line 296B and determines that the session can now end, because all of the information required for completing the user request has been provided. At line 298B, the LM 120 sends an API call ("done( )") to the state handler 115 to cause the state handler 115 to terminate the session.

Although examples are provided in which user input is received from the user frontend 110 as text, the GAIN system 100 can be configured in various examples to receive multi-modal input, including, for example, text, video, audio, etc. In those examples, the LM 120 can be configured to receive data from one or more of the supported modalities directly, or in other examples convert input to a particular modality before processing the input. For example, the LM 120 may receive audio input from the user frontend 110 and process the audio input directly to generate one or more corresponding API calls as output. In other examples, the LM 120 can perform a speech-to-text operation to convert audio into text, before processing the text.

Actions performed by the agent 105 at different API nodes can also be multi-modal. For example, instead of communicating through text output, the agent 105 can communicate through audio or video, using any of a variety of techniques for generating synthetic audio or video, as appropriate.

In some examples, the LM 120 can be trained to issue API calls that cause the agent 105 to perform actions independent of the current state of the conversation graph. These actions can include providing output cues by the agent to better simulate a natural conversation between the agent and a user. For example, the LM 120 can issue wait commands for causing the agent to wait before advancing to a next node or performing another action associated with a current node. The LM 120 may do so in response to predicting that the user input has not been completely received, for example because user input is being received as separate short messages over a chat window.

As another example, the LM 120 can issue API commands that cause the agent 105 to perform one or more actions to continue to engage the user, for example by providing output such as "I understand," or "mm-hmm," while receiving user input. Other API commands can be issued contextually. For example, the LM can cause the agent to output a message of condolence, for example, "I'm sorry to hear that," in response to predicting that the user input indicates a negative experience or problem. In other examples, if the LM 120 is unable to predict an API call to generate as output, for example within a predetermined confidence threshold, the LM 120 can default to issuing an API command to cause the agent to prompt the user for clarification. An example prompt of this type can be outputting "Sorry, I'm not sure I understand." Other formulations of these and other prompts are possible for a variety of different situations that are not dependent on the current state of the conversation graph.

In some examples, any of a variety of different optimization techniques may also be applied to the LM 120 before, during, or after training. For example, the LM 120 may be cached for more efficient processing at inference versus not caching the LM 120.

Example Methods

Figure 3:
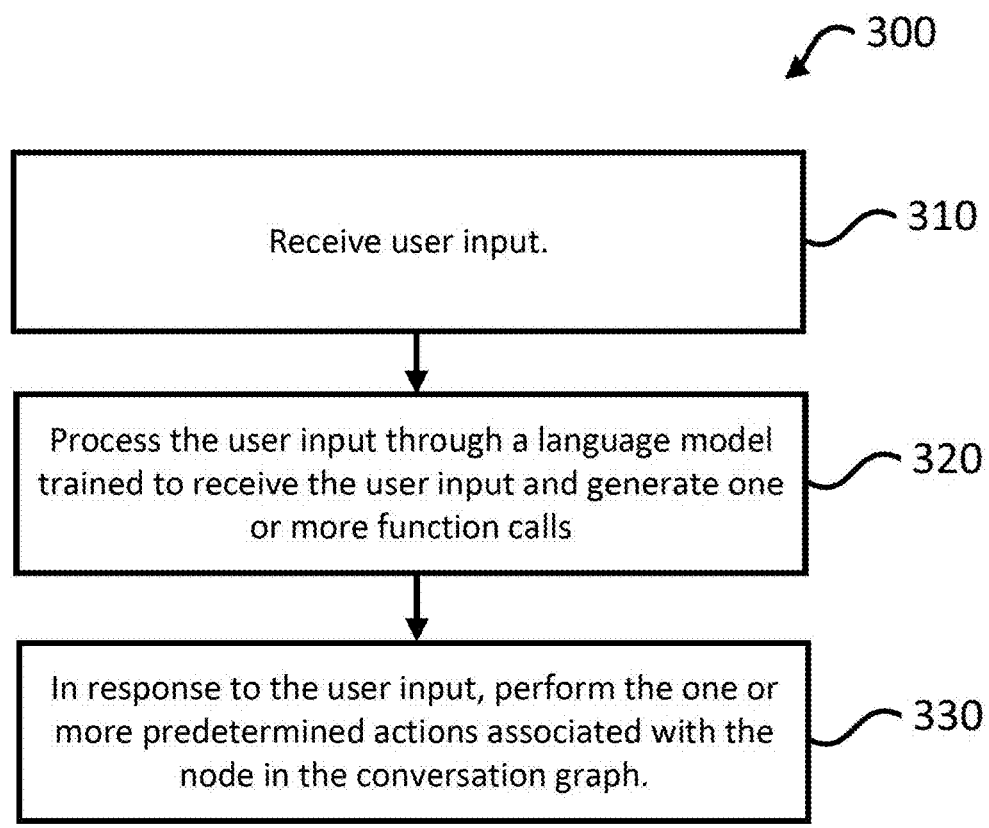
FIG. 3 is a flow diagram of an example process for navigating a conversation graph using a language model, according to aspects of the disclosure.

FIG. 3 is a flow diagram of an example process 300 for navigating a conversation graph using a language model, according to aspects of the disclosure.

A GAIN system including one or more processors receives user input, according to block 310. The user input can be natural language, for example in text or in speech.

The GAIN system processes the user input through a language model trained to receive the user input and generate one or more function calls, according to block 320. The one or more function calls can include a first function call which, when executed by the one or more processors, causes the one or more processors to perform one or more predetermined actions associated with a node of a conversation graph specified in the function call. The one or more function calls can be API calls.

The language model can be further trained to receive the user input and additional information. The additional information can include one or more of a current position in the conversation graph, data specifying a path to the current position from a root node of the conversation and one or more saved parameter values.

The GAIN system can at least partially implement a user frontend and a state handler. The system can be further configured to send, by the state handler, a prompt for the user input; receive, from the user frontend, the user input, send, to the language model, the user input, and the additional information, receive from the language model and by the state handler, the one or more API calls, and in response to receiving the one or more API calls, performing, by the state handler, the one or more predetermined actions.

As described herein, the conversation graph can include nodes each representing a possible state of a conversation between an automated conversational agent and a user. The edges between the nodes can represent transitions between states in the conversation. As described herein with reference to FIGS. 2A-B, the edges and nodes can each be associated with respective one or more predetermined actions that the one or more processors of the system can perform.

In addition, the GAIN system can update the state of the conversation graph to indicate that the current node in the conversation graph is the node specified in the function call and perform the one or more predetermined actions corresponding to the current node in the conversation graph.

In response to the user input, the GAIN system performs one or more predetermined actions associated with the node in the conversation graph, according to block 330. As described herein with reference to FIGS. 1-2B, the one or more predetermined actions can include one or more of sending a prompt to a user computing device for more information for responding to the user input; providing information responsive to the user input; updating one or more parameter values with information provided from the user input, the one or more parameters saved in one or more memory devices by the one or more processors; and updating the current node in the conversation graph to a different node and performing one or more predetermined actions associated with the different node.

Training examples for training the language can be a portion of session logs generated based on a conversation graph. TABLE 1 shows an example input training example labeled with an expected API call. The GAIN system or another system of one or more processors, for example a training system configured to train the GAIN system, can be configured to generate training data from session logs. Training examples in the data can include one or more pairs. A pair can include one or more lines from a session log, such as the log shown in TABLE 1. The one or more session log lines can be paired with one or more API calls issued by the LM in response to the one or more session log lines, representing the desired output of the LM at a point in a conversation between an agent and a user.

TABLE 1

| | |
|---|---|
| 1 | STATE HANDLER: EVENT(UTTERANCE("I would like a shirt")), STATE(PARAM(department, ?, {Catalog, Customer Care, My Order})) |
| 2 | LM: department = Catalog |
| 3 | LM: ask |
| 4 | STATE HANDLER: EVENT(UTTERANCE("Big Band sounds cool")), STATE(PARAM(department, Catalog, {Catalog, Customer Care, My Order}) PARAM(artist, ?, {Big Band, Little Band"})) |
| 5 | LM: artist = Big Band |
| 6 | LM: merch = shirt |
| 7 | LM: ask |
| 8 | STATE HANDLER: EVENT(UTTERANCE("long sleeve is better")), STATE (PARAM(department, Catalog, {Catalog, Customer Care, My Order}) PARAM(artist, Big Band, {Big Band, Little Band}) |

TABLE 1-continued

| | |
|---|---|
| | PARAM(merch, shirt, {shirt, music, tour movie}) PARAM (shirt, ?, {t-shirt, long sleeve })) |
| 9 | EXPECTED OUTPUT: LM: shirt = long_sleeve |

A session log includes rows specifying communication to and from a user and the state handler, as well as queries and responses to and from a conversational agent and the frontend. The current state at a given log line current position in the conversation graph the agent is in, the state can also include the path from the root node to the current node, to indicate where the conversation has taken the agent in the past, as additional information for training the LM for outputting the correct action for the state handler to take. Additional information can also include any saved parameter values obtained earlier in the conversation.

The training example shown in TABLE 1 can be used to generate multiple different training examples of different lengths. For example, given a training example that is a session log with only line 1, the training example can be labeled with line 2, indicating that the correct response to "I would like a shirt" is to navigate to the node of the conversation graph corresponding to a part of the session in which the state handler prompts the user to select an item from a department catalog.

The session logs can be synthetic, for example generated through hand-written or manually performed interactions in which one person operates as the user and the same or another user performs the correct moves in the conversation graph that the agent should respond with based on the conversation. The session logs can be recorded as part of actual sessions between users and the system. As another training example, the LM can receive a session log manually annotated with conversation graph positions.

The LM 120 can be trained by the GAIN system 100 or by one or more computing devices separate from the GAIN system 100 and/or the platform 101. In some examples, the LM 120 may be partially trained outside of the GAIN system 100 and fine-tuned or retrained with additional training data by the GAIN system 100.

Because the LM 120 is trained to generate API calls, evaluating the performance of the LM 120 during training or validation can be performed by pattern matching a correct label representing the correct API call for the LM 120 to output at a given position within a conversation graph. An offline metric for evaluating the accuracy of the LM 120 can be the percentage of correct predictions on a test set.

For example, when the system 100 is configured to train LM 120, it can perform one or more iterations of backpropagation with gradient descent and model parameter update, until predetermined convergence criteria are met. The convergence criteria can include, for example, a maximum number of iterations of backpropagation, gradient descent, and model parameter update. The convergence criteria can additionally or alternatively define a minimum improvement between training iterations, for example measured by a relative or absolute reduction in the computed error between output predicted by the system 100 and corresponding ground-truth labels on training data reserved for validation. In some examples, the system 100 can be trained for 1000 epochs with early stopping where a validation error is not improved for 10 epochs. Other convergence criteria can be based on a maximum amount of computing resources allocated for training, for example a total amount of training time exceeded, or total number of processing cycles consumed, after which training is terminated.

Training data for training the LM 120 can be one or more training examples, for example, a mini batch of training examples representing some subset of the total training data, or a set of training data.

The system can use the loss as part of a training process, such as backpropagation with stochastic, minibatch, or batch gradient descent, to update model parameter values of the LM 120.

In some examples, the LM can be an LM trained to receive syntax and navigate trees or other graph structures generally, and not conversation graphs specifically. This base LM can be fine-tuned or further trained to handle specific types of conversation graphs. For example, the base LM can be further trained on session data based on conversation logs, for agents communicating with customers of a telecommunications company. As another example, the base LM can be further trained on session data for agents communicating with customers. Session data can refer to recorded conversations between a user and an agent, the conversations can be manually rated, for example, based on the agent being on-topic and providing the user with their desire.

A base LM can be a base model trained on natural language, and further trained to generate API calls as output for navigating a conversation graph. In other examples, the base LM can be trained for navigating certain types of conversation graphs, for example graphs related to conversations between a user and an agent in a domain such as retail shopping, tech support, healthcare, etc., and be further trained with session data for a specific conversation graph within one of those pretrained domains. In some examples, any of a variety of different knowledge or model distillation techniques may be applied to the base model for training an LM specific to a domain or particular application of a user within a domain.

In some examples, the LM 120 can issue API commands to cause the agent to perform actions for manipulating a data structure. For example, an API can be defined for adding or removing instructions from a set of code instructions, represented as a list. The user frontend 110 can pass natural language input to the agent 105 corresponding to commands for the agent 105 to perform in manipulating the list. An example input can be "insert a print statement after the first 'for' loop." The LM 120 can receive the input and generate an API call for causing the agent 105 to perform a corresponding action to manipulate the list, in this example by adding a print statement after the first 'for' loop in the set of code instructions.

As another example, the LM 120 can receive natural language input for causing an agent to navigate a physical or virtual space. For example, the GAIN system 100 can be part of a processing pipeline for handling user input for a video game or other form of interactive media. In other examples, the GAIN system 100 can be part of a processing pipeline for handling user input for causing a physical agent, such as a robot, to navigate a maze or other space. For example, the user input can be one or more commands by voice or audio, which can be passed by input to the LM 120. The LM 120 can generate, as output, one or more API calls for causing the virtual or physical agent to move. For example, the API calls can be issued directly to a physical agent, such as a robot, configured to move in accordance with the received API calls. As another example, a virtual agent can have its position updated within a virtual environment in accordance with API calls received within the virtual environment.

In some examples, the base LM may be structured from the bottom-up, with progressively more specific layers corresponding to navigating a conversation graph of a particular domain or business vertical. For example, on top of the base LM may be one or more layers trained specifically for navigating a conversation graph for a telecommunications enterprise providing customer service to its customers. These one or more layers may be trained using session logs synthetically generated or recorded from actual sessions between users and a conversational agent, as described herein with reference to FIG. 1.

In some examples, the base LM is trained initially online, using natural language data available over the internet or another network or source of data. The base LM can be a large language model trained from hundreds or thousands of natural language training examples, before being further trained to navigate a conversation graph according to aspects of the disclosure.

Figure 4:
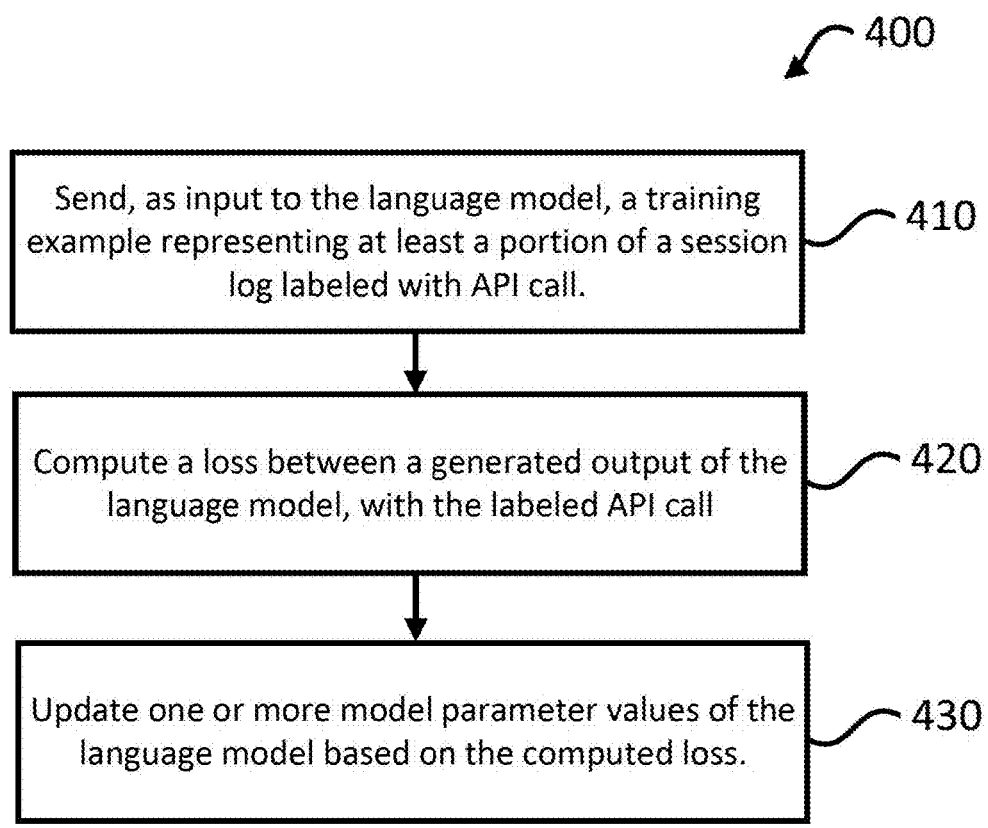
FIG. 4 is a flow diagram of an example process for training a language model, according to aspects of the disclosure.

FIG. 4 is a flow diagram of an example process for training a language model, according to aspects of the disclosure. FIG. 4 shows a single iteration of one or more iterations of process steps the GAIN system or another appropriately configured system can perform to train the language model. For example, the process 400 can be repeated one or more times until one or more convergence criteria are met.

The GAIN system sends, as input to the language model, a training example representing at least a portion of a session log labeled with an API call, according to block 410. The session log can be generated using the conversation graph, for example by using the conversation graph to create transitions from one state of a conversation recorded in the session log, to another.

The GAIN system computes a loss between a generated output of the language model from the training example, with the labeled API call, according to block 420. In computing the loss, the GAIN system can compute a lexicographical distance between the labeled API call and generated output.

The GAIN system updates one or more model parameter values, for example weights and/or biases, of the language model, based on the computed loss, according to block 430. As described herein, the GAIN system or another system can apply backpropagation with gradient descent and update the model parameter values accordingly.

In some examples, in training the language model, the GAIN system can receive a base language model not trained using training examples including session logs generated using the conversation graph. The GAIN system can train the base language model for one or more iterations using training examples representing at least portions of session logs corresponding to conversations generated based on the conversation graph.

Checkpoints

In some examples, the agent can send API calls to the state handler to save checkpoints of a traversal through a conversation graph, during a session. Saving a checkpoint can be useful, for example, when the conversation requires switching between handling different user requests during a session.

TABLE 2 is an example session log in which checkpoints are implemented.

TABLE 2

| | |
|---|---|
| 1 | STATE HANDLER: "How may I assist you" |
| 2 | USER FRONTEND: "I want to buy a T-shirt from Big Band." |
| 3 | LM: department = Catalog |
| 4 | LM: catalog = artist |

TABLE 2-continued

| | |
|---|---|
| 5 | LM: artist = Big Band |
| 6 | LM: merch = shirt |
| 7 | LM: shirt_type = T-shirt |
| 8 | LM: ask |
| 9 | STATE HANDLER: "What size do you want for the shirt? (XS, S, M, L)" |
| 10 | USER FRONTEND: "Will my T-shirt arrive in three weeks?" |
| 11 | LM: save_checkpoint_1 |
| 12 | LM: department = customer_care |
| 13 | LM: customer_care = shipping |
| 14 | LM: go_to_checkpoint_1 |
| 15 | LM: ask |

Figure 5A:
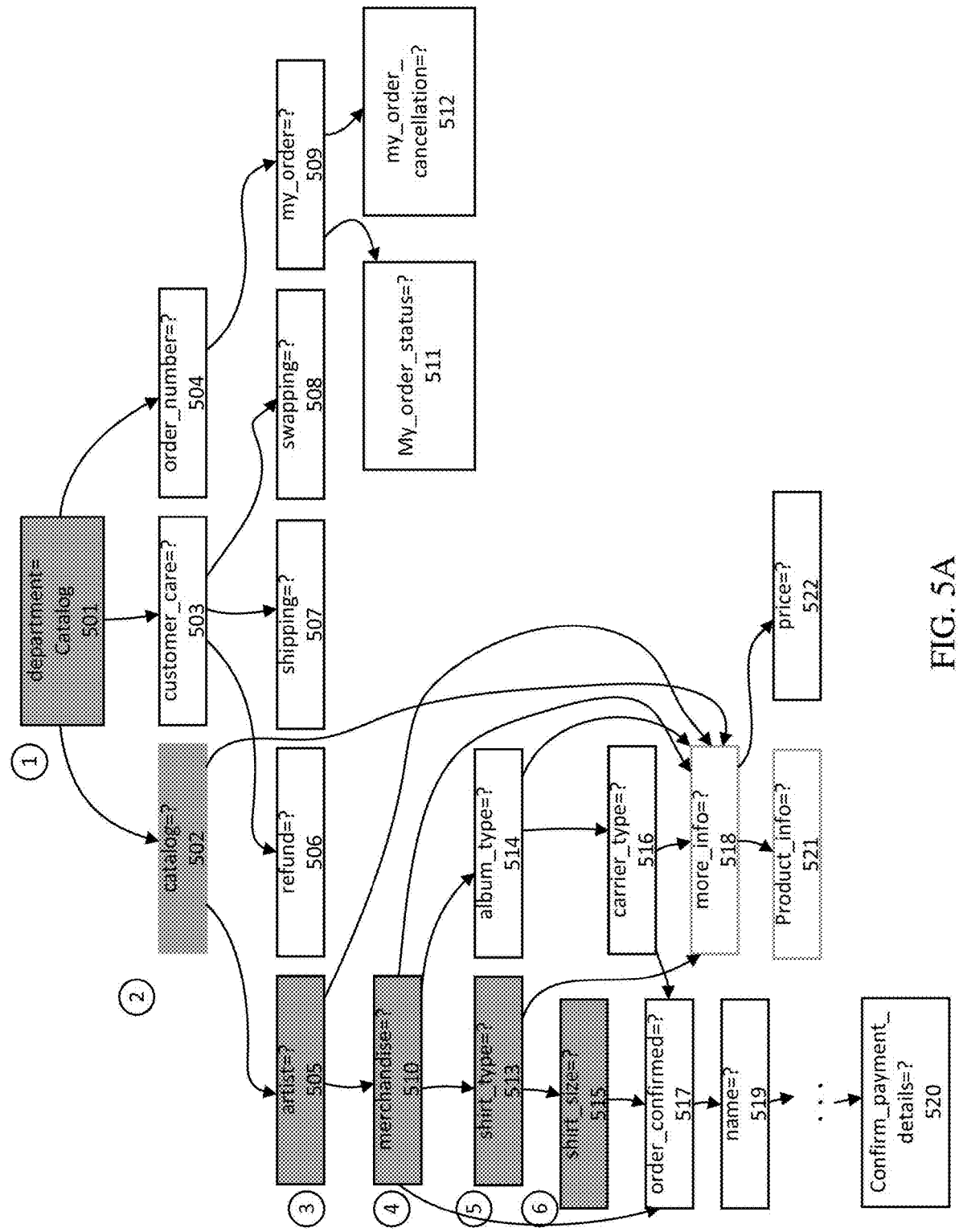
FIG. 5A shows an example traversal of a conversation graph by the agent for lines 1 through 9 for TABLE 2.

FIG. 5A shows an example traversal 500A of a conversation graph 500 by the agent for lines 1 through 9 for TABLE 2. The visited nodes are shaded and labeled with sequence identifiers 1 through 6, indicating the order in which the nodes are visited.

After the state handler prompts the user for a shirt size, according to line 9 of TABLE 2, the user frontend instead responds with a different query ("Will my T-shirt arrive in three weeks?"), according to line 10. To resolve this query, a different traversal of the graph 500 is necessary, which the LM can predict requires traversing to shipping node 507 through customer care node 503.

Figure 5B:
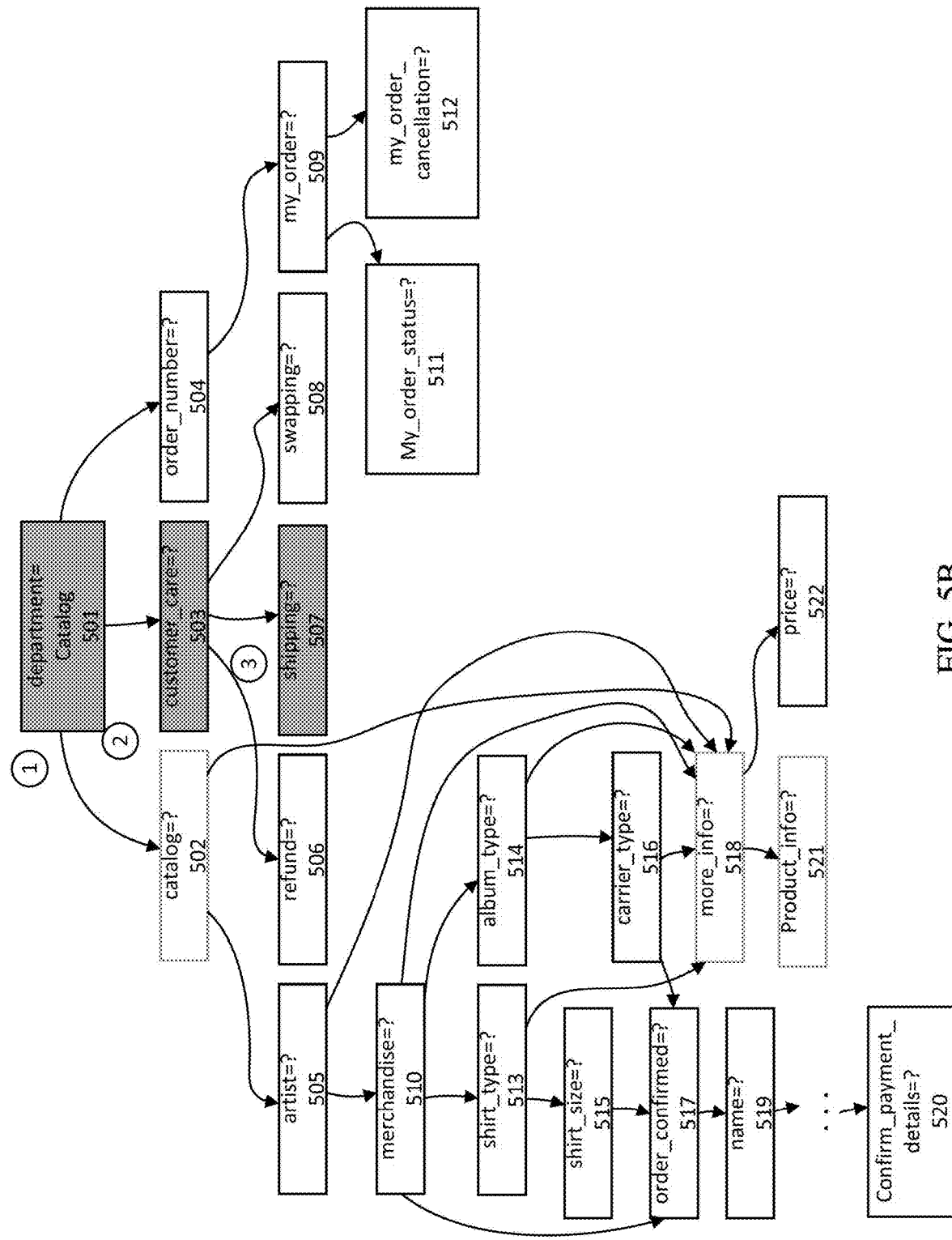
FIG. 5B shows an example traversal of the conversation graph by the agent for addressing the user request in line 10 of TABLE 2.

FIG. 5B shows an example traversal 500B of the conversation graph 500 by the agent for addressing the user request in line 10 of TABLE 2. Nodes 501, 503, and 507 are shaded, and visited by the agent in that order. Because the agent receives two separate requests that require resolution by traversal to unrelated portions of the same conversation graph, the LM 120 can generate checkpoints for switching back and forth between multiple traversals. At least through the use of checkpoints, it is not necessary to define explicit paths, for example from the artist/merch/shirt_type/shirt_size nodes to the more_info node.

Instead, the GAIN system can determine whether the next position in the conversation graph is not adjacent to the current node and save a checkpoint for the current node. Then, the GAIN system can send an API call to cause the state handler to traverse another node, for responding to the user's new request. After the user request is resolved, the LM can output a call to return to the last checkpoint. Although shown with a single checkpoint, it is understood that in other examples, the GAIN system can maintain multiple checkpoints for handling nested user requests in a session.

Training data for the GAIN system can be labeled with API calls that cause the agent to create checkpoints. For example, training data can be manually labeled according to when a human operator believes a checkpoint is necessary to respond to a new request from a user. The GAIN system, in turn, can identify patterns from the received training data, and learn when a checkpoint is appropriate during a conversation. An example pattern can be when a subsequent request relates to desired information that may appear later in conversation from the earlier request. The subsequent request is prioritized and responded to using a checkpoint, however as it was related to the earlier request, the checkpoint is appropriate for returning to the original request after the subsequent request is addressed.

In TABLE 2, the LM receives input first indicating that the user would like to purchase a shirt (line 2), before receiving a subsequent request asking for a delivery timeframe of the shirt (line 10). As the subsequent request is related to the first request but perhaps out-of-order from when the agent would communicate a delivery time, the LM can send an API call to the agent to issue a checkpoint and cause the agent to transition to a different part of the conversation graph to address the subsequent request. The agent then may not repeat information about a delivery estimate as part of resolving the first request, because the information was provided to the user already after the checkpoint.

As shown in TABLE 2, at line 11, the LM issues a save_checkpoint_1 call, to save the current node. At lines 12-13, the LM issues API calls predicted to cause the agent to resolve the user request from line 10. Afterwards, the LM issues a call to return to the original checkpoint ("go_to_checkpoint_1"), at line 14, and sends a final API call to cause the agent to ask the previous question ("What size do you want for the shirt? (XS, S, M, L)"), at line 15.

In some examples, the GAIN system can maintain multiple instances of a conversation graph, with different traversals to handle different user requests. For instance, referring to TABLE 2, when the state handler receives the prompt from the user frontend on line 10 about T-shirt arrival time, the GAIN system can start a new graph and begin traversing the graph according to the calls issued by the LM at lines 12-13.

Figure 5C:
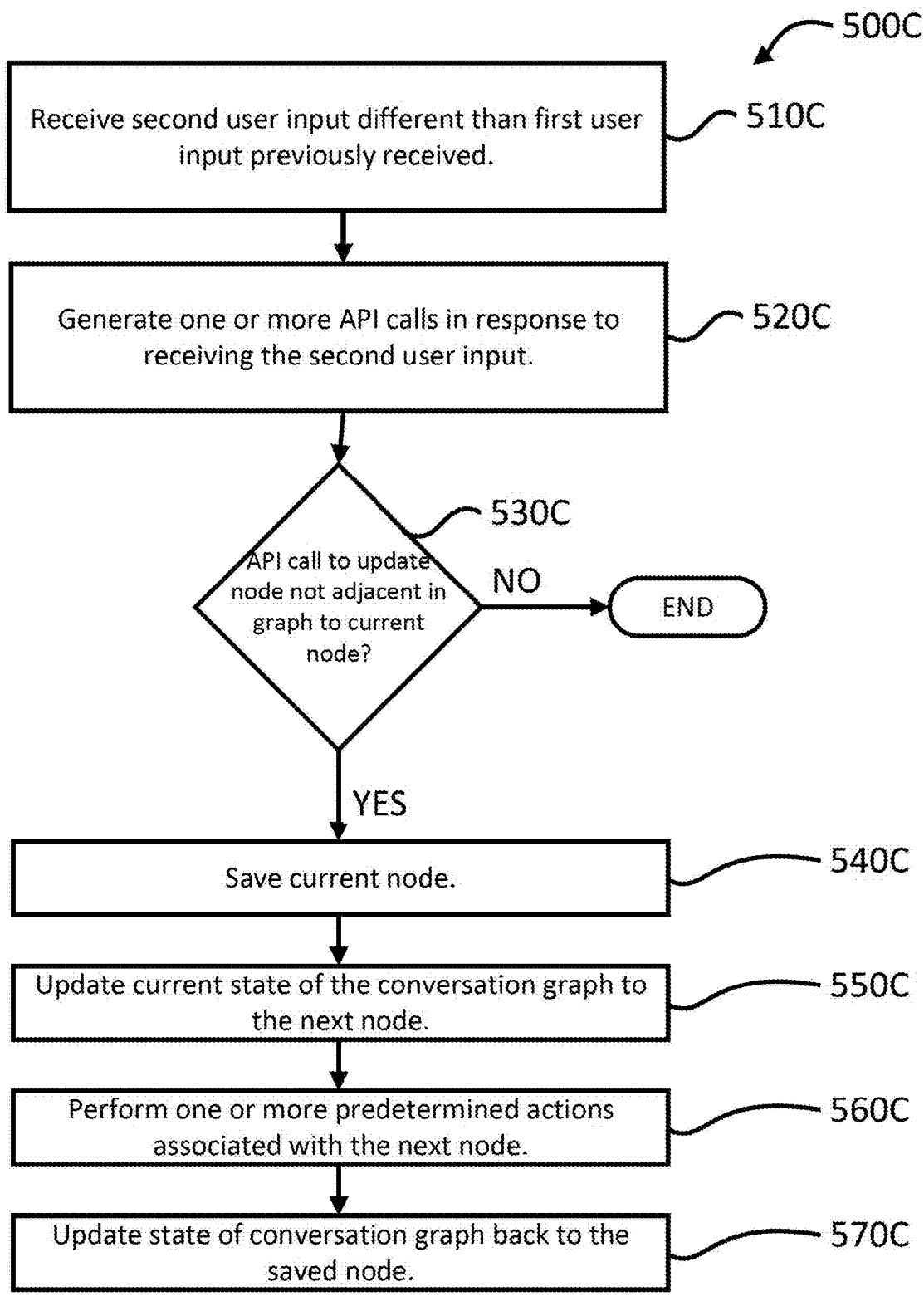
FIG. 5C is a flow diagram of an example process for implementing checkpoints in a conversation graph by an LM trained as described herein

FIG. 5C is a flow diagram of an example process 500C for implementing checkpoints in a conversation graph by an LM trained as described herein.

The GAIN system receives second input that is different from the first user input previously received, according to block 510C. For example, the first user input can relate to the user wishing to order a T-Shirt as predicted by the LM. The second input can be the user's query as to the estimated arrival time of the T-Shirt, as described herein with reference to TABLE 2.

The GAIN system generates one or more API calls in response to receiving the second user input, according to block 520C.

The GAIN system determines whether the one or more API calls to update a node to the current state of the conversation graph is not adjacent to a current node representing the current state of the conversation graph, according to decision block 530C. For example, if the API call would cause the state handler to begin to go down a separate path of the conversation graph, the GAIN system would make a positive determination ("YES") at decision block 530C. Otherwise ("NO"), the process 500 may end.

In response to a positive determination, the GAIN system saves the current node 540C. As shown in block 550C, the GAIN system updates the current state of the conversation graph to the next node (indicated from the one or more API calls generated according to block 520C). The GAIN system performs one or more predetermined actions associated with the next node, according to block 560C. To return to handling the earlier request from the first user input, the GAIN system updates the state of the conversation graph back to the saved node, according to block 570C.

The GAIN system can handle sessions in which users express multiple intents, for example expressed within the same user input. To do so, the GAIN system can traverse in both directions of the conversation graph, for example to address prompts from the user for information before returning to an earlier state to prompt the user for further requests.

Figure 6:
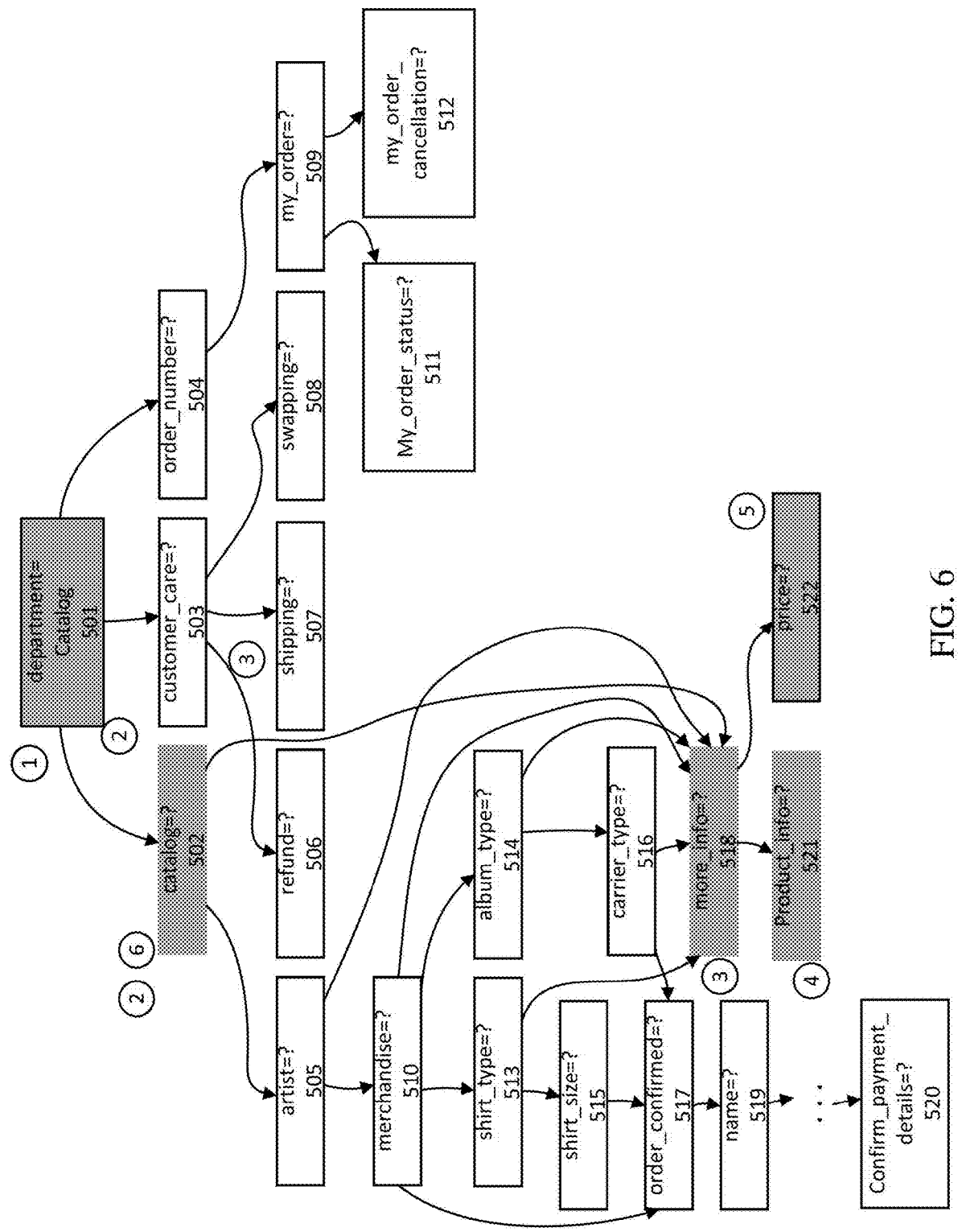
FIG. 6 illustrates an example traversal of the conversation graph according to the session log of TABLE 3.

TABLE 3 is an example session log between the GAIN system and a user, in which the GAIN system handles multiple intents from the user. FIG. 6 and TABLE 3 illustrate how the GAIN system may traverse to the correct nodes in a conversation graph, without the conversation graph being prelabeled for different routes based on different predicted intents.

TABLE 3

| | |
|---|---|
| 1 | USER FRONTEND: "What do you sell and at what price?" |
| 2 | LM: department = Catalog |
| 3 | LM: catalog = more_info |
| 4 | LM: more_info = product_info |
| 5 | STATE HANDLER: "We sell shirts, music, or the tour movie" |
| 6 | LM: more_info = price_info |
| 7 | STATE HANDLER: "A t-shirt costs $25 and a long-sleeve shirt costs $35" |
| 8 | LM: catalog = ? |
| 9 | LM: ask |
| 10 | STATE HANDLER: "Would you like to buy something?" |

FIG. 6 illustrates an example traversal of the conversation graph according to the session log of TABLE 3. Nodes visited in the conversation graph as part of the traversal appear shaded and their position in the traversal indicated by a number in a circle adjacent to the node.

After receiving the user input at line 1 of TABLE 3, the conversational agent predicts that the user is interested in both the sorts of things being sold, as well as their cost. The LM at line 2 passes an API call to the state handler to advance to the catalog node 502. In lines 2 and 3 the conversational agent passes additional API calls to advance the state handler to product info node 521 by way of the more info node 518. At the product info node 521, the state handler outputs predetermined text specifying the types of products for sale, as shown in line 5 of TABLE 3. Because the LM predicted the user's interest in pricing information, the conversational agent next outputs an API call to the move the state handler to the price node 522 (line 6 in TABLE 3), to cause the state handler to provide pricing information, as shown by line 7 of TABLE 3.

After providing information to the user frontend, the LM sends an API call to cause the state handler to move back to the catalog node 502, as shown by line 8 of TABLE 3. The LM also sends an API call prompting the state handler to send a predetermined prompt for information at node 502 to the user frontend. The prompt sent is shown as line 10 in TABLE 3.

The GAIN system can extract multiple parameters from the same user input, for example when the state handler receives user input specifying multiple pieces of unprompted information. To do so, the GAIN system can traverse in both directions of the conversation graph, for example to address prompts from the user for information before returning to an earlier state to prompt the user for further requests.

TABLE 4

| | |
|---|---|
| 1 | USER FRONTEND: "Hello, I would like a small t-shirt from Big Band, ship it to Joe Doe at 123 main street, New Town, CA, 12345, USA." |
| 2 | LM: department = Catalog |
| 3 | LM: catalog = artist |
| 4 | LM: artist = Big Band |
| 5 | LM: shirt_type = t-shirt |
| 6 | LM: shirt_size = S |
| 7 | LM: ask |
| 8 | STATE HANDLER: "Do you confirm that you would like to order?" |
| 9 | USER FRONTEND: "Yes" |
| 10 | LM: order_confirmed = Yes |
| 11 | LM: name = Joe Doe |
| 12 | LM: address = 123 main street |

TABLE 4-continued

| | |
|---|---|
| 13 | LM: zip code = 12345 |
| 14 | LM: city = New Town |
| 15 | LM: country = USA |
| 16 | STATE HANDLER: "What's your email?" |
| 17 | USER FRONTEND: "joedoe@email.com" |
| 18 | LM: email = joedoe@email.com |
| 19 | STATE HANDLER: "Can you confirm that you want to proceed?" |
| 20 | USER FRONTEND: "Yeah" |
| 21 | LM: done |

TABLE 4 is an example session log between the GAIN system and a user, in which the GAIN system extracts multiple parameter values from user input.

Figure 7:
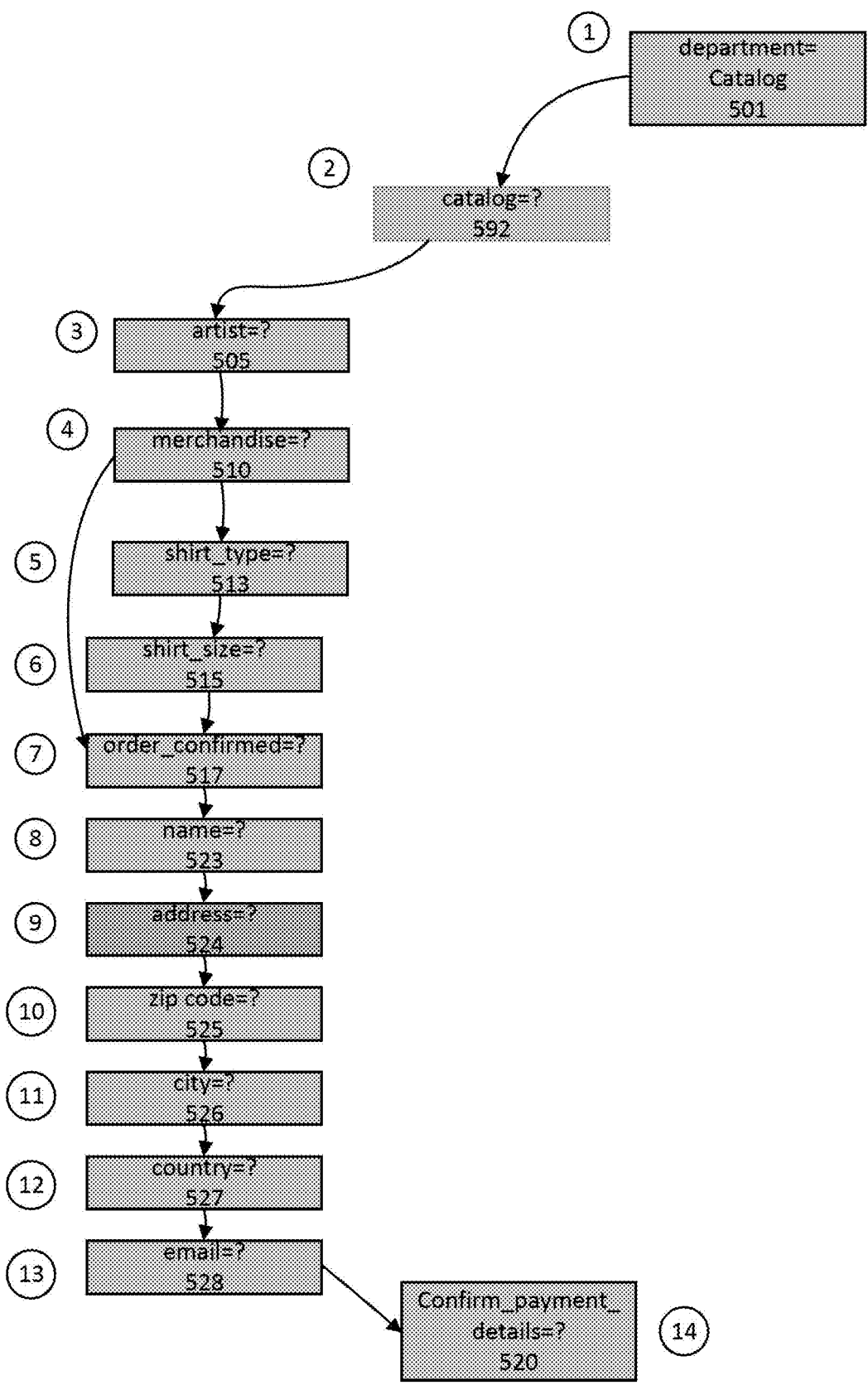
FIG. 7 illustrates an example traversal of a portion of a conversation graph according to the session log of TABLE 4.

FIG. 7 illustrates an example traversal of a portion of a conversation graph according to the session log of TABLE 4. In line 1, the state handler receives detailed information from the user frontend. The LM predicts that the user wishes to make a purchase, and issues several API calls, shown in line 2-7. Because of the detailed information provided by the user input, the LM can automatically fill in some information, such as the catalog type, artist name, shirt type, and shirt size.

At line 8, the state handler prompts the user for order confirmation. At line 9, the state handler receives input in response. The LM processes the input ("YES"), according to like 10, and continues to fill in information previously provided to the agent by the user.

In some examples, the conversational agent can predict the correct city or other information even when explicitly provided in user input. For example, the conversational agent may fill in information for the country if not provided, based on the rest of the provided address. The LM determines only that an email address is missing and sends an API call causing the state handler to prompt the user for that information, according to line 16.

It has been observed that layering can be done for adapting an LM to handle conversations in different languages. The LM may be trained with session data in English and generalized to other languages previously unseen in the training data. In some examples, the LM can be trained in English and fine-tuned with a smaller training dataset in another language.

TABLE 5 is an example session log between the GAIN system and a user, in which the GAIN system is trained on English session logs and receives user input in French. TABLE 5 illustrates how the GAIN system may traverse to the correct nodes in a conversation graph, even when the GAIN system is not explicitly trained to handle input in French. The translated English of the user input is provided in parentheticals.

TABLE 5

| | |
|---|---|
| 1 | USER FRONTEND: Je voudrais un t-shirt taille tres petit d'Big Band ("I would like a t-shirt size very small from Big Band") |
| 2 | LM: department = Catalog |
| 3 | LM: catalog = artist |
| 4 | LM: artist = Big Band |
| 5 | LM: merch = shirt |
| 6 | LM: shirt_type = t-shirt |
| 7 | LM: shirt_size = XS |
| 8 | STATE HANDLER: Do you confirm that you want to order? |
| 9 | USER FRONTEND: "oui" ("yes") |
| 10 | LM: order_confirmed = yes |

TABLE 5-continued

| 11 | STATE HANDLER: "What's your first name?" |
| 12 | USER FRONTEND: "Mon nom est Joe Doe" ("My name is Joe Doe") |
| 13 | LM: first_name: Joe |
| 14 | LM: last_name: Doe |
| 15 | STATE HANDLER: "What's your address?" |

Figure 8:
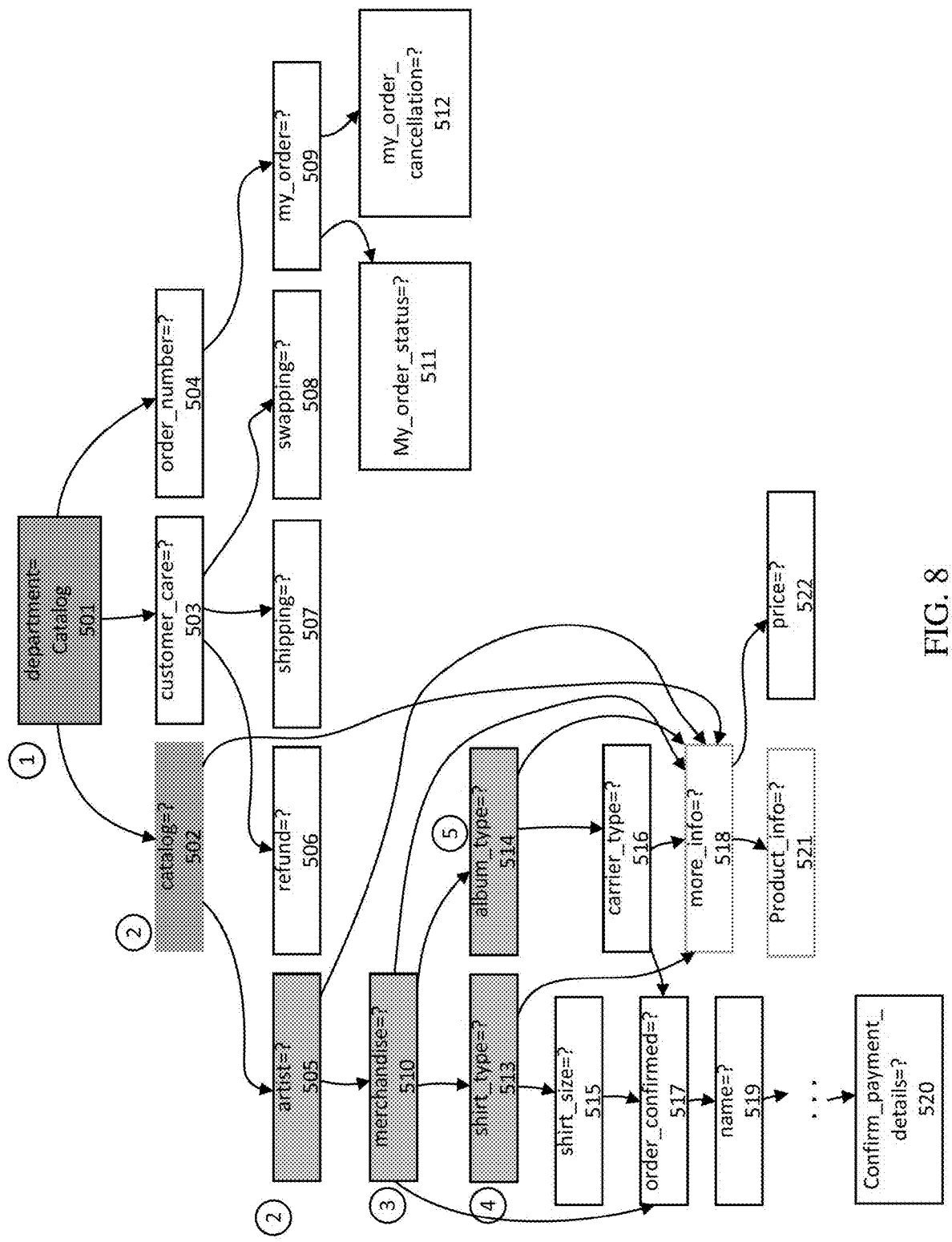
FIG. 8 shows an example traversal of the conversation graph based on the session log in TABLE 6.

The GAIN system can handle changes in user requests, mid-session. TABLE 6 is a session log showing the agent initially handling a user request to purchase a T-shirt for Big Band. FIG. 8 shows an example traversal of the conversation graph 500 based on the session log in TABLE 6. Labeled nodes 1 through 4. When prompted for a T-shirt size at line 8, the user frontend instead returns "Actually, I would like an album, instead." The LM can send an API call to switch to the album type node 514 and continue to gather the necessary information to fulfill the user request, as shown by lines 10-12 of TABLE 6.

TABLE 6

| 1 | USER FRONTEND: "Buy me a T-shirt from Big Band." |
| 2 | LM: department = Catalog |
| 3 | LM: catalog = artist |
| 4 | LM: artist = Big Band |
| 5 | LM: merch = shirt |
| 6 | LM: merch = T-shirt |
| 7 | LM: ask |
| 8 | STATE HANDLER: "What size do you want for the T-shirt? (XS, S, M, L)" |
| 9 | USER FRONTEND: "Actually, I would like an album instead." |
| 10 | LM: merch = music |
| 11 | LM: ask |
| 12 | STATE HANDLER: "We have a Greatest Hits Album of the Live Album? Which one do you want?" |

Figure 9:
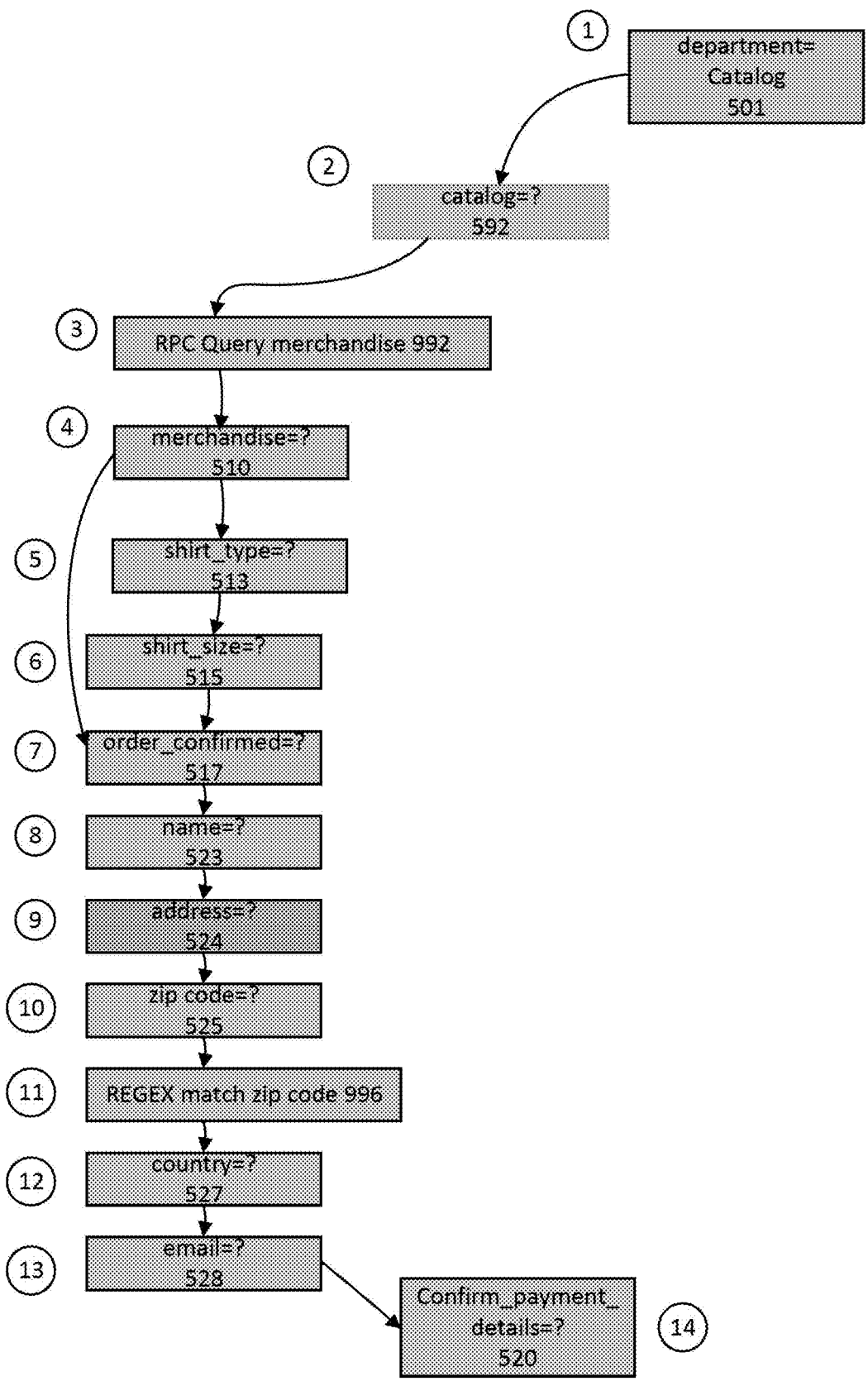
FIG. 9 illustrates a conversation graph including a regular expression ("regex") node and a remote procedure call ("RPC") node.

FIG. 9 has been added to support the use of regex and RPC nodes. Please let me know if the description is complete and accurate, or if there is additional detail we can add.]

FIG. 9 illustrates a conversation graph 900 including a regular expression ("regex") node 996 and a remote procedure call ("RPC") node 992. The conversation graph 900 includes nodes 501, 592, 510, 513, 515, 517, 523, 524, 525, 527, 528, and 520. As described with reference to FIG. 7, these nodes can be traversed by the agent in accordance with API calls issued by the LM. The conversation graph 900 also includes an RPC Query Merchandise node 992 ("RPCE node 992").

The RPC node 992 in this example can be performed automatically after the agent performs the one or more actions associated with the catalog node 592. In this example, the RPC node 992 can cause the agent to issue an RPC to a device, for example a server or other computing device, to query a list of available merchandise items. As the actions associated with the merchandise node 510 may include outputting a list of available items, the RPC node 992 enables the agent to retrieve an up-to-date list of merchandise items for outputting to the user frontend. Other RPC nodes can be inserted between various API nodes for retrieving information used as part of performing the one or more actions associated with an API node.

As another example, an RPC node before the merchandise node 992, when traversed by the agent, may cause the agent to query a database for available inventory before outputting a list of available merchandise. The inclusion of RPC nodes can allow for the retrieval of up-to-date information, without requiring the actions associated with the various API nodes be hard-coded or manually updated.

The conversation graph 900 also includes a regular expression ("regex") match zip code node 996 ("regex node 996"). Similar to the RPC node 992, the agent can automatically advance to a regex node after performing one or more actions associated with a previous node, such as API node 525. In the conversation graph 900, the agent prompts the user for a zip code, which can be an action associated with the zip code node 525. Following the zip code node 525, the agent can follow the graph 900 to the regex node 996, and match input received from the user frontend with a known regular expression for valid zip codes. To perform the match, the agent can use a regex engine, such as regex engine 127 as described herein with reference to FIG. 1.

Regex nodes can also be used at different positions in the conversation graph to explicitly match a retrieved user response with predetermined responses, to avoid the risk of error or misinterpretation. For example, the conversation graph 900 may include a regex node after the node 517, to match the user's response with a regular expression of predetermined responses for confirming the user's order. Predetermined responses can be, for example, "yes," "no," "confirmed," "nope," etc.

Figure 10:
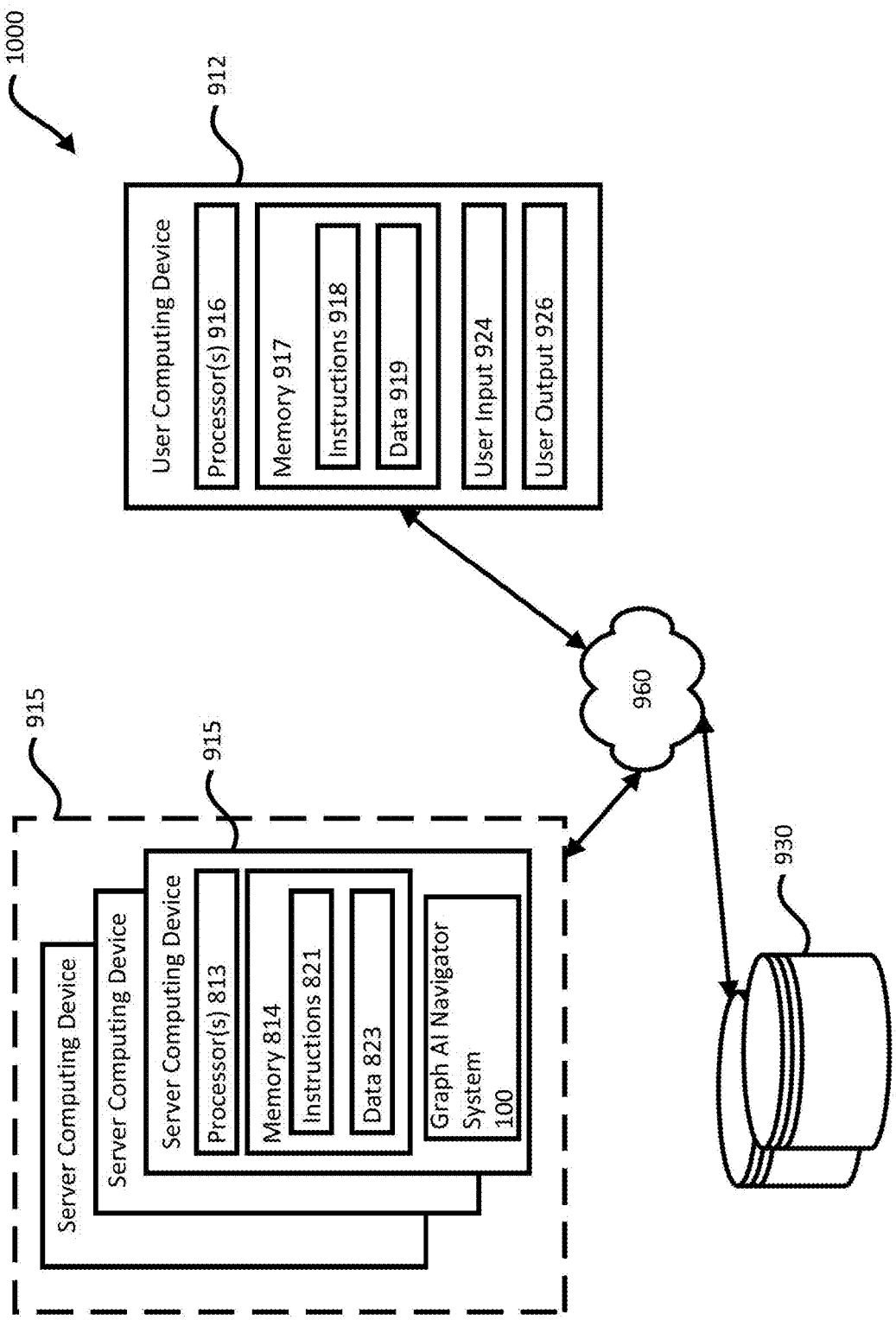
FIG. 10 is a block diagram of an example environment for implementing the GAIN system.

FIG. 10 is a block diagram of an example environment 1000 for implementing the GAIN system 100. The system 100 can be implemented on one or more devices having one or more processors in one or more locations, such as in server computing device 915. User computing device 912 and the server computing device 915 can be communicatively coupled to one or more storage devices 530 over a network 960. The storage device(s) 930 can be a combination of volatile and non-volatile memory and can be at the same or different physical locations than the computing devices 912, 915. For example, the storage device(s) 930 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 915 can include one or more processors 913 and memory 914. The memory 914 can store information accessible by the processor(s) 913, including instructions 921 that can be executed by the processor(s) 913. The memory 914 can also include data 523 that can be retrieved, manipulated, or stored by the processor(s) 913. The memory 914 can be a type of non-transitory computer readable medium capable of storing information accessible by the processor(s) 913, such as volatile and non-volatile memory. The processor(s) 913 can include one or more central processing units (CPUs), graphic processing units (GPUs), field-programmable gate arrays (FPGAs), and/or application-specific integrated circuits (ASICs), such as tensor processing units (TPUs).

The instructions 921 can include one or more instructions that when executed by the processor(s) 913, causes the one or more processors to perform actions defined by the instructions. The instructions 921 can be stored in object code format for direct processing by the processor(s) 913, or in other formats including interpretable scripts or collections of independent source code modules that are interpreted on demand or compiled in advance. The instructions 921 can include instructions for implementing the system 400 consistent with aspects of this disclosure. The system 400 can be executed using the processor(s) 913, and/or using other processors remotely located from the server computing device 915.

The data 923 can be retrieved, stored, or modified by the processor(s) 913 in accordance with the instructions 921. The data 923 can be stored in computer registers, in a relational or non-relational database as a table having a plurality of different fields and records, or as JSON, YAML, proto, or XML documents. The data 923 can also be formatted in a computer-readable format such as, but not limited to, binary values, ASCII, or Unicode. Moreover, the data 923 can include information sufficient to identify relevant information, such as numbers, descriptive text, proprietary codes, pointers, references to data stored in other memories, including other network locations, or information that is used by a function to calculate relevant data.

The user computing device 912 can also be configured similarly to the server computing device 915, with one or more processors 916, memory 917, instructions 918, and data 919. The user computing device 912 can also include a user output 926, and a user input 924. The user input 924 can include any appropriate mechanism or technique for receiving input from a user, such as keyboard, mouse, mechanical actuators, soft actuators, touchscreens, microphones, and sensors.

The server computing device 915 can be configured to transmit data to the user computing device 912, and the user computing device 912 can be configured to display at least a portion of the received data on a display implemented as part of the user output 526. The user output 526 can also be used for displaying an interface between the user computing device 912 and the server computing device 915. The user output 526 can alternatively or additionally include one or more speakers, transducers or other audio outputs, a haptic interface or other tactile feedback that provides non-visual and non-audible information to the platform user of the user computing device 912.

Although FIG. 5 illustrates the processors 913, 916 and the memories 914, 917 as being within the computing devices 915, 912, components described in this specification, including the processors 913, 916 and the memories 514, 917 can include multiple processors and memories that can operate in different physical locations and not within the same computing device. For example, some of the instructions 921, 918 and the data 923, 519 can be stored on a removable SD card and others within a read-only computer chip. Some or all of the instructions and data can be stored in a location physically remote from, yet still accessible by, the processors 913, 916. Similarly, the processors 913, 916 can include a collection of processors that can perform concurrent and/or sequential operation. The computing devices 915, 912 can each include one or more internal clocks providing timing information, which can be used for time measurement for operations and programs run by the computing devices 915, 912.

The server computing device 915 can be configured to receive requests to process data from the user computing device 912. For example, the environment 1000 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 912 may receive and transmit data specifying target computing resources to be allocated for executing a neural network trained to perform a particular neural network task.

The devices 912, 915 can be capable of direct and indirect communication over the network 960. The devices 915, 912 can set up listening sockets that may accept an initiating connection for sending and receiving information. The network 960 itself can include various configurations and protocols including the Internet, World Wide Web, intranets, virtual private networks, wide area networks, local networks, and private networks using communication protocols proprietary to one or more companies. The network 960 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 960, in addition or alternatively, can also support wired connections between the devices 912, 915, including over various types of Ethernet connection.

Although a single server computing device 915 and user computing device 912 are shown in FIG. 9, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A system comprising:
one or more processors configured to:
receive one or more user inputs; and
iteratively navigate a conversation graph according to the one or more user inputs, wherein the conversation graph comprises nodes and edges, each node representing a possible state of a conversation between an automated conversational agent and a user, each edge connecting two nodes thereby representing a transition between respective states of the conversation, wherein each node is associated with one or more respective predetermined actions, and wherein in each iteration of navigation of the conversation graph, the one or more processors are configured to:
process at least one user input of the one or more user inputs through a language model trained to receive the at least one user input and generate a function call based on the at least one user input, wherein the function call is an Application Programming Interface (API) call of an API;
determine a state change from a current node to a first next node that is next adjacent to the current node in the conversation graph according to the function call; and
perform the one or more predetermined actions associated with the first next node in the conversation graph,
wherein the one or more processors are further configured to:
train the language model until reaching one or more convergence criteria, wherein in training the language model, the one or more processors are configured to perform one or more iterations of:
sending, as input to the language model, a training example representing at least a portion of a session log labeled with an API call, the session log generated using the conversation graph, and computing a loss between a generated output of the language model from the training example, with the labeled API call, and
updating one or more model parameter values of the language model based on the computed loss.

2. The system of claim 1,
wherein the one or more processors are further configured to:
update a current state of the conversation graph to indicate that the current node in the conversation graph is the node specified in the function call.

3. The system of claim 1,
wherein the one or more predetermined actions comprise one or more of:
sending a prompt to a user computing device for more information for responding to the at least one user input;
providing information responsive to the at least one user input; and
updating one or more parameter values with information provided from the at least one user input, the one or more parameters saved in one or more memory devices by the one or more processors.

4. The system of claim 3,
wherein the language model is further trained to:
receive the at least one user input and additional information comprising one or more of a current position in the conversation graph, data specifying a path to the current position from a root node of the conversation graph, or the one or more saved parameter values, and
generate the API call based on the at least one user input and the additional information.

5. The system of claim 4,
wherein the one or more processors at least partially implement a user frontend and a state handler, and wherein the one or more processors are further configured to:
send, by the state handler, a prompt for the at least one user input;
receive, from the user frontend, the at least one user input;
send, to the language model, the at least one user input and the additional information;
receive, from the language model and by the state handler, the API call; and
in response to receiving the API call:
navigate, by the state handler, the conversation graph to the first next node according to the API call; and
perform, by the state handler, the one or more predetermined actions.

6. The system of claim 1, wherein in computing the loss, the one or more processors are configured to compute a lexicographical distance between the labeled API call and the generated output.

7. The system of claim 1, wherein in training the language model, the one or more processors are further configured to:
receive a base language model not trained using training examples comprising session logs generated using the conversation graph; and
train the base language model for the one or more iterations using training examples representing at least portions of session logs corresponding to conversations generated based on the conversation graph.

8. The system of claim 1,
wherein the one or more user inputs includes a first user input; and a second user input that is different from the first user input, and
wherein the one or more processors are further configured to:
generate one or more second API calls in response to receiving the second user input; and determine that the one or more second API calls comprise an API call to update a current state of the conversation graph by traversing from the current node to a second next node that is not next adjacent to the current node, and in response:
save the current node as a saved node,
update the current state of the conversation graph to the second next node,
perform the one or more predetermined actions associated with the second next node, and,
update the current state of the conversation graph back to the saved node.

9. A method comprising:
receiving, by one or more processors, one or more user inputs;
iteratively navigating, by the one or more processors, a conversation graph according to the one or more user inputs, wherein the conversation graph comprises nodes and edges, each node representing a possible state of a conversation between an automated conversational agent and a user, each edge connecting two nodes thereby representing a transition between respective states of the conversation, wherein each node is associated with one or more respective predetermined actions, and wherein each iteration of navigation of the conversation graph comprises:
processing at least one user input of the one or more user inputs through a language model trained to receive the at least one user input and generate a function call based on the at least one user input, wherein the function call is an Application Programming Interface (API) call of an API;
determining a state change from a current node to a first next node that is next adjacent to the current node in the conversation graph; and
performing, by the one or more processors, the one or more predetermined actions associated with the first next node in the conversation graph,
wherein the method further comprises:
training, by the one or more processors, the language model until reaching one or more convergence criteria, wherein in training the language model, the one or more processors are configured to perform one or more iterations of:
sending, as input to the language model, a training example representing at least a portion of a session log labeled with an API call, the session log generated using the conversation graph, and
computing a loss between a generated output of the language model from the training example, with the labeled API call, and
updating one or more model parameter values of the language model based on the computed loss.

10. The method of claim 9,
wherein the method further comprises:
updating, by the one or more processors, a current state of the conversation graph to indicate that the current node in the conversation graph is the node specified in the function call.

11. The method of claim 9, wherein the one or more predetermined actions comprise one or more of:
sending a prompt to a user computing device for more information for responding to the at least one user input;
providing information responsive to the at least one user input; and
updating one or more parameter values with information provided from the at least one user input, the one or more parameters saved in one or more memory devices by the one or more processors.

12. The method of claim 11,
wherein the language model is further trained to:
receive the at least one user input and additional information comprising one or more of a current position in the conversation graph, data specifying a path to the current position from a root node of the conversation graph, or the one or more saved parameter values, and
generate the one or more API calls based on the at least one user input and the additional information.

13. The method of claim 12,
wherein the one or more processors at least partially implement a user frontend and a state handler, and wherein the method further comprises:
sending, by the state handler, a prompt for the at least one user input;
receiving, from the user frontend, the at least one user input;
sending, to the language model, the at least one user input and the additional information;
receiving, from the language model and by the state handler, the API call; and
in response to receiving the API call:
navigating, by the state handler, the conversion graph to the first next node according to the API call; and
performing, by the state handler, the one or more predetermined actions.

14. The method of claim 9, wherein computing the loss comprises computing, by the one or more processors, a lexicographical distance between the labeled API call and the generated output.

15. The method of claim 9, wherein training the language model further comprises:
receiving, by the one or more processors, a base language model not trained using training examples comprising session logs generated using the conversation graph; and
training, by the one or more processors, the base language model for the one or more iterations using training examples representing at least portions of session logs corresponding to conversations generated based on the conversation graph.

16. One or more non-transitory computer-readable storage media storing instructions that when executed by one or more processors, causes the one or more processors to perform operations comprising:
receiving one or more user inputs;
iteratively navigating a conversation graph according to the one or more user inputs, wherein the conversation graph comprises nodes and edges, each node representing a possible state of a conversation between an automated conversational agent and a user, each edge connecting two nodes thereby representing a transition between respective states of the conversation, wherein each node is associated with one or more respective predetermined actions, and wherein each iteration of navigation of the conversation graph comprises:
processing at least one user input of the one or more user inputs through a language model trained to receive the at least one user input and generate a function call based on the at least one user input, wherein the function call is an Application Programming Interface (API) call of an API;

determining a state change from a current node to a first next node that is next adjacent to the current node in the conversation graph;

performing the one or more predetermined actions associated with the first next node in the conversation graph; and training the language model until reaching one or more convergence criteria, wherein in training the language model, the one or more processors are configured to perform one or more iterations of:

sending, as input to the language model, a training example representing at least a portion of a session log labeled with an API call, the session log generated using the conversation graph, and computing a loss between a generated output of the language model from the training example, with the labeled API call, and updating one or more model parameter values of the language model based on the computed loss.

* * * * *